(12) United States Patent
Sugimura

(10) Patent No.: US 6,297,687 B1
(45) Date of Patent: *Oct. 2, 2001

(54) DRIVE CONTROL CIRCUIT OF CHARGED PUMP CIRCUIT

(75) Inventor: Naoaki Sugimura, Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,500

(22) Filed: Jul. 30, 1999

(30) Foreign Application Priority Data

Aug. 11, 1998 (JP) ................................................. 10-227205

(51) Int. Cl.[7] .................................. G05F 3/16; G05F 1/46
(52) U.S. Cl. .............................. 327/536; 327/537; 363/60; 323/313
(58) Field of Search .................................... 327/535, 536, 327/537; 363/59, 60; 323/313

(56) References Cited

U.S. PATENT DOCUMENTS 5,898,335 * 4/1999 Miyamoto et al. .................. 327/535
5,978,283 * 11/1999 Hsu et al. ............................. 327/536

* cited by examiner

Primary Examiner—My-Trang Nu Ton
Assistant Examiner—Terry L. Englund
(74) Attorney, Agent, or Firm—Jones Volentine, PLLC

(57) ABSTRACT

A drive control circuit of a charged pump circuit has a power source voltage detecting circuit for detecting a power source voltage, a control circuit for changing the number of the drive steps of the charged pump circuit in accordance with the detected output of the power source voltage detecting circuit, and a by-pass circuit for allowing an output at the last step to be by-passed towards an output side of the drive steps in accordance with a change in the number of drive steps of the charged pump circuit.

14 Claims, 15 Drawing Sheets

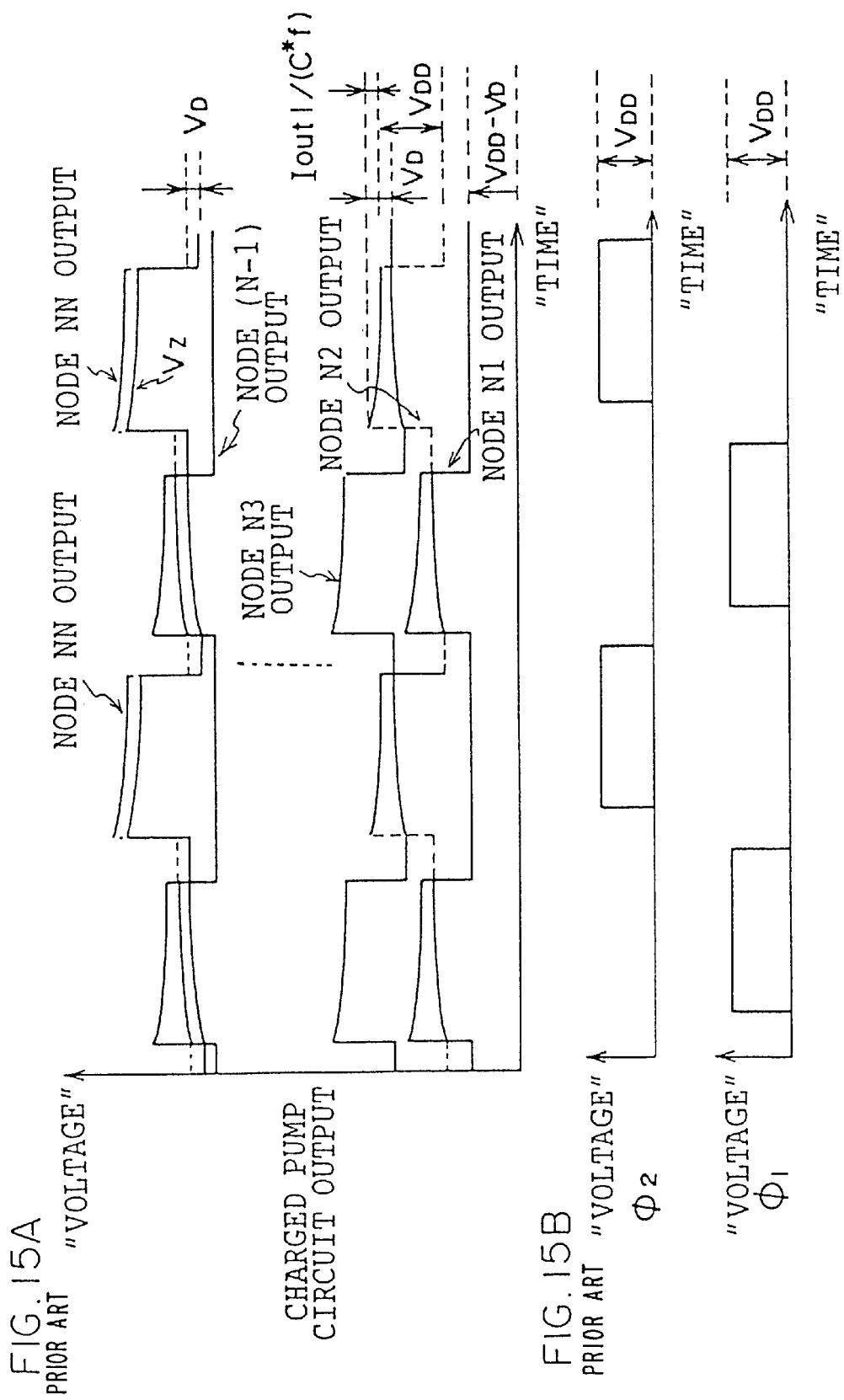

DRIVE CONTROL CIRCUIT OF CHARGED PUMP CIRCUIT

BACKGROUND OF THE INVENTION

1. Field of the Invention

The present invention relates to a drive control circuit of a charged pump circuit for raising a voltage inside an LSI in a semiconductor integrated circuit, and more particularly to a drive control circuit of a charged pump circuit for inhibiting an increase in consumed current caused by an excess of ability of the charged pump at the time of an increase in the voltage of an operating power source of the LSI and, at the same time for compensating for a reduction in the ability of the output of the increased voltage of the charged pump at the time of a reduction in the operating power source.

2. Description of the Related Art

No related art has been found which describes a technique with respect to a charged pump circuit which increases the voltage inside an LSI in a semiconductor integrated circuit, or a technique for preventing an increase in the consumed current caused by an excess of ability of the charged pump at the time of an increase in the operating power source voltage and compensating for a reduction of output ability in the increased voltage of the charged pump at the time of a reduction in the operation power source voltage.

FIG. 12 shows a structure of a general charged pump circuit. In FIG. 12, NMOS diodes ND1 through NDn (n is an integer) and NDout are connected in series between an input terminal 100 and an output terminal 200. To each of the nodes N1 through Nn of the NMOS diodes ND1 through NDn, one end of n capacitors C1 through Cn is connected respectively. To the other end of the capacitor C(2(m−1)+1) (m<n and m is an integer not less than 1) out of n capacitors C1 through Cn, a clock $\phi1$ is supplied via inverters INV1, INV3, . . . INV(n−1).

Furthermore, a clock $\phi2$ is supplied to the other end of the capacitor C(2m) via inverters INV2, INV4, . . . , INVn.

Furthermore, a power source voltage VDD is applied to the input terminal 100. As shown in FIG. 13B, clocks $\phi1$ and $\phi2$ are clock signals which change in levels in a compensating manner at a timing at which high level periods do not overlap each other. The amplitude thereof is the VDD. The operation of the charged pump circuit shown in FIG. 12 will be briefly explained. When the threshold voltage of NMOS diodes ND1 through NDn and ND out is set to VD, the potential of node 1 is set to VDD−VD when the clock $\phi1$ is on a low level. When the clock $\phi1$ is on a high level and the clock $\phi2$ is on a low level, current flows from the node N1 to the node N2, from the node N3 to the node N4, . . . , and from the node N(n−1) to the node Nn, and the potential of the node N(2m) becomes higher than the potential of the node N(2m+1) by the threshold voltage VD of the NMOS diode (for reference, m is either 0 or an integer not less than 1).

Next, when the clock $\phi1$ falls to a low level, the potentials of the nodes N1, N2, . . . , N2m, . . . , Nn tend to fall by the amount of the VDD because of the coupling of capacitors. However, current is supplied from the left side, and the potentials are raised to a higher level than when the clock $\phi1$ was previously on a low level. Next, when the clock $\phi2$ is raised to a high level, a current is supplied from the node N(2m−1) to the node N(2m). When the clock $\phi2$ is brought back to the low level, a current is supplied from the node N(2m−2) to the node N(2m−1) so that the potential of the node N(2m−1) is raised to a higher level than the potential thereof at the time of the previous cycle.

When the capacity of the capacitors C1 through Cn is denoted by C, the frequency of the clocks $\phi1$ and $\phi2$ is denoted by f, the output amplitude voltage of the inverters INV1 through INVn is denoted by VDD, and the output average current value at an output terminal 200 of the charged pump circuit is denoted by Iout, the potential of each node is raised by the amount (VDD−VD−Iout/(C·f)) as shown in FIG. 13A as compared with the potential of the node by the adjacent input terminal 100. Here, Iout/(C·f) denotes a charging and discharging voltage in the capacitors C1 through Cn. In other words, since the output voltage Vout at an output terminal of the charged pump circuit shown in FIG. 12 is raised by the amount (VDD−VD−Iout/(C·f)) for each one step of the NMOS diode, the following mathematical formula is established.

$$Vout = VDD + n \cdot (VDD - VD - Iout/(C \cdot f)) - VD \quad (1)$$

The average consumed current IDD of this charged pump circuit excluding a through current of the inverters (consumed current at the time of ON and OFF inside the inverters) is the sum total of the current values at which each of the inverters INV1 through INVn charges and discharges the capacitors C1 through Cn at the output average current value Iout, and the following mathematical formula is established.

$$IDD = n \cdot Iout \quad (2)$$

In order to set the output voltage Vout at the output terminal 200 to a constant level, the output average current value Iout 1 of the charged pump circuit becomes equal to the sum total of the output average current value Iout and a Zener current Iz in the case where Zener diodes ZD 1 and ZD 2 are connected between the output terminal 200 and an earth as shown in FIG. 14. If the output voltage of the charged pump circuit shown in FIG. 14 which circuit is clamped at the Zener diodes ZD 1 and ZD 2 is denoted by Vz, the following mathematical formula is established.

$$Vz = VDD + n \cdot (VDD - VD - (Iout + Iz)/(C \cdot f)) - VD = Vout - n \cdot Iz/(C \cdot f) \quad (3)$$

From the mathematical formulae (1), (2) and (3), the Zener current Iz, and the average consumed current IDD is established in the following manner.

$$Iz = (Vout - Vz)/n \cdot C \cdot f \quad (4)$$

$$IDD = n \cdot (Iout + Iz) \quad (5)$$

When the output average current value Iout is at a constant level, the output voltage Vout increases as seen from the mathematical formula (1) at the time when the power source voltage VDD increases, and the Zener current Iz and the average consumed current IDD increase according to the mathematical expressions (4) and (5). FIGS. 15A and 15B show operating waveforms of a charged pump circuit having the structure shown in FIG. 14.

In a conventional charged pump circuit, since the number of steps of the NMOS diodes, namely the number of steps n of the charged pump circuit and the capacity C of the capacitors (1−Cn) which are connected to each of the nodes of the NMOS diodes, are fixed values which are determined at the time of the circuit design, there arises a problem that an unutilized Zener current Iz which flows to the Zener diodes for use in the output voltage clamp increases and the average consumed current IDD of the inverters increases with an increase of the power source voltage VDD in the case where the output average current value Iout of the charged pump circuit is constant.

SUMMARY OF THE INVENTION

The present invention has been made in view of the aforementioned circumstances, and an object of the present invention is to provide a drive control circuit of a charged pump circuit which circuit is capable of inhibiting an increase of the average consumed current IDD of the inverters at the time of the increase in the power source voltage VDD in the case where the output average current value Iout is constant.

In order to attain the aforementioned object, according to a first aspect of the present invention, there is provided a drive control circuit of a charge pump circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a power source voltage detecting circuit for detecting said power source voltage;

a control circuit for changing the number of drive steps of said charge pump circuit in accordance with the output detected by the power source voltage detecting circuit; and a by-pass circuit for allowing the final output of the drive steps to be by-passed towards said output terminal in accordance with the change in the number of drive steps.

According to the first aspect of the present invention, the power source voltage VDD is detected with the power source voltage detecting circuit, the number of the drive steps of the charged pump circuit is changed by the control circuit in accordance with the detected output of the power source voltage VDD, and the output of the last step of the drive steps can be allowed to be by-passed towards the output terminal of the charged pump circuit in accordance with the change in the number of drive steps of the charged pump circuit by the by-pass circuit with the result that the number of drive steps of the charged pump circuit can be changed in accordance with increases and decreases in the VDD voltage.

Consequently, in the case where the output average current (load current) value Iout is constant as in the conventional charged pump circuit, it is possible to inhibit an increase in unutilized Zener current Iz which flows through the Zener diodes for use in the output voltage clamp at the time of an increase in the power source voltage VDD, and to inhibit an increase in the average consumed current IDD as a result of an increase in this Zener current Iz.

According to a second aspect of the present invention, there is provided a drive control circuit of the charge control circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a current detecting circuit for detecting current flowing to said Zener diodes;

a control circuit for changing the number of drive steps of said charge pump circuit in accordance with the output detected by the power source voltage detecting circuit; and a by-pass circuit for allowing the final output of the drive steps to be by-passed towards said output terminal in accordance with the change in the number of drive steps.

According to the second aspect of the present invention, there is provided a current detecting circuit for detecting current flowing through the Zener diodes for use in the output voltage clamp connected between the output terminal of the charged pump circuit and the earth, the control circuit for changing the number of drive steps of the charged pump circuit in accordance with the detected output of the current detecting circuit, and the by-pass circuit for allowing the output of the last step of the drive steps to be by-passed towards the aforementioned output terminal in accordance with the change in the number of drive steps with the result that the number of drive steps of the charged pump circuit can be changed in accordance with increases and decreases in the Zener current Iz which flows through the Zener diodes for use in the output voltage clamp.

Consequently, in the case where the output average current (load current) value Iout in the conventional charged pump circuit is constant, it is possible to inhibit an increase in unutilized Zener current Iz which flows through the Zener diodes for use in the output voltage clamp at the time of an increase in the power source VDD, and to inhibit an increase in the average consumed current IDD as a result of an increase in this Zener current Iz.

Furthermore, according to the second aspect of the invention, since the unutilized Zener current Iz which flows through the Zener diodes for use in the output voltage clamp is detected with a current detecting circuit, and the number of drive steps of the charged pump circuit is changed in accordance with increases and decreases in the Zener current Iz, it is possible to prevent unutilized Zener current from increasing along with the change in the output average current (load current) value Iout in the charged pump circuit, and to prevent the average consumed current IDD from increasing as a result of an increase in this Zener current Iz.

According to a third aspect of the present invention, there is provided a drive control circuit of a charge pump circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a power source voltage detecting circuit for detecting said power source voltage;

a control circuit for changing the number of drive steps of said charge pump circuit in accordance with the output detected by the power source voltage detecting circuit; and a by-pass circuit for allowing said power source voltage to be by-passed in such a manner as to be supplied to the input side of the first step of the drive steps in accordance with the change in the number of drive steps.

According to the third aspect of the present invention, since the present invention has a control circuit for changing the number of drive steps of the charged pump circuit in accordance with the detected output of the power source detecting circuit, and the by-pass circuit for allowing the power source voltage to be bypassed so that the power source voltage is supplied to the input side of the first step of the drive steps in accordance with the change in the number of drive steps of the charged pump circuit with the result that the number of drive steps of the charged pump can be changed in accordance with increases and decreases of the power source voltage.

Consequently, in the case where the output average current (load current) value Iout is constant as in the conventional charged pump circuit, it is possible to inhibit unutilized Zener current Iz which flows through the Zener diodes for use in the output voltage clamp from increasing at the time of an increase in the power source voltage VDD, and to prohibit the average current IDD from increasing as a result of the increase in this Zener current Iz.

According to a fourth aspect of the present invention, there is provided a drive control circuit of the charge control circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a current detecting circuit for detecting current flowing to said Zener diodes;

a control circuit for changing the number of drive steps of said charge pump circuit in accordance with the output detected by the power source voltage detecting circuit; and a by-pass circuit for allowing said power source voltage to be by-passed in such a manner as to be supplied to the input side of the first step of the drive steps in accordance with the change in the number of drive steps.

According to the fourth aspect of the invention, since the present invention has a current detecting circuit for detecting the current flowing through the Zener diodes for use in the output voltage clamp connected between the output terminal of the charged pump circuit and the earth, a control circuit for changing the number of drive steps of the charged pump circuit in accordance with at least one of the detected output of the current detecting circuit and the power source voltage, and a by-pass circuit for allowing the power source voltage to be by-passed in such a manner that the power source voltage is supplied to the input side of the first step of the drive steps in accordance with the change in the number of drive steps of the charged pump circuit, the number of steps of the charged pump circuit which are actually operated can be changed in accordance with increases and decreases of the power source voltage VDD.

Consequently, in the case where output average current (load current) value Iout in the conventional charged pump circuit is constant, it is possible to inhibit unutilized Zener current which flows through Zener diodes for use in the output voltage clamp from increasing at the time of an increase in the power source voltage VDD, and to inhibit the average consumed current from increasing as a result of an increase of this Zener current Iz.

Furthermore, according to the fourth aspect of the invention, since the unutilized Zener current Iz which flows through Zener diodes for use in the output voltage clamp is detected with the Zener current detecting circuit and the number of drive steps of the charged pump is changed in accordance with increases and decreases in the Zener current Iz, it is possible to prevent the unutilized Zener current Iz from increasing along with the change in the output average current (load current) value in the charged pump circuit, and to prevent the average consumed current IDD from increasing as a result of an increase in this Zener current Iz.

According to a fifth aspect of the present invention, there is provided a drive control circuit of the charge control circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a constant current source circuit for generating a constant current having a negative power source voltage dependency constant;

an oscillation circuit which is driven by the constant current having a negative power source voltage dependency constant generated by the constant power source circuit, for generating a pulse signal of a frequency having a negative power source voltage dependency constant; and a clock signal supply circuit for creating said two types of clock signal on the basis of the pulse signal output from the oscillation circuit and supplying said two types of clock signal to the charge pump circuit.

According to the fifth aspect of the invention, the constant current having a negative power source voltage dependency constant is generated by the constant current source generating circuit, and a pulse signal of a frequency having a negative power source voltage dependency constant is generated, and the charged pump circuit is driven by a clock having the frequency by the clock signal supplying circuit with the result that the operating frequency of the charged pump circuit can be changed in accordance with increases and decreases in the power source voltage VDD.

Consequently, in the case where the output average current (load current) value Iout in the conventional charged pump circuit is constant, it is possible to inhibit unutilized Zener current Iz which flows through the Zener diodes for use in the output voltage clamp from increasing at the time of an increase in the power source voltage VDD, and to inhibit the average consumed current IDD from increasing as a result of an increase in this Zener current Iz.

According a sixth aspect of the invention, there is provided a drive control circuit of the charge control circuit having:

a plurality of diodes connected in series between an input terminal and an output terminal;

a plurality of capacitors one end of each of which is connected to each node of said plurality of diodes and to the other end of each of which is supplied a clock signal;

Zener diodes for use in an output voltage clamp connected between said output terminal and an earth; wherein said drive control circuit of a charge pump circuit has a plurality of drive steps which raise the power source voltage supplied to said input terminal to a predetermined voltage by supplying two types of clock signals which change levels in a compensating manner so that high level periods do not overlap each other to each of said other terminals of adjacent capacitors in each of said plurality of capacitors and then output the power source voltage, and said drive control circuit of a charge pump circuit comprises:

a current detecting circuit for detecting current flowing to said Zener diodes;

a constant current source circuit for fetching the output detected by the current detecting circuit and generating a constant current in reverse proportion to the value of the current flowing to said Zener diodes;

an oscillation circuit driven by the constant current source circuit for generating a pulse frequency of a frequency in reverse proportion to the value of the current flowing to said Zener diodes; and a clock signal supply circuit for creating said two types of clock signal on the basis of the pulse signal output from the oscillation circuit and supplying the two types of clock signal to the charge pump circuit.

According to a sixth aspect of the invention, the current which flows through the Zener diodes for use in the output voltage clamp connected between the output terminal of the charged pump circuit and the earth is detected with the current detecting circuit; the detected output of the current detecting circuit is fetched; the constant current which is in inverse proportion to the value of the current flowing through the aforementioned Zener diodes is generated by the constant current source circuit; a pulse signal of the frequency is generated with an oscillation circuit which is driven by the constant current source circuit, the frequency being in inverse proportion to the value of the current flowing through the Zener diodes; and the two kinds of clock signals are prepared by the clock signal supply circuit on the basis of the pulse signal which is output from the oscillation circuit with the result that an operating frequency of the charged pump circuit can be changed in accordance with increases and decreases in the Zener current Iz.

Consequently, in the case where the output average current (load current) value Iout in the conventional charged pump circuit is constant, it is possible to inhibit unutilized Zener current Iz which flows through the Zener diodes for use in the output voltage clamp from increasing at the time of an increase in the power source voltage VDD, and to inhibit the average consumed current IDD from increasing as a result of the increase in this Zener current Iz.

Furthermore, according to the sixth embodiment of the present invention, since the unutilized Zener current Iz which flows through the Zener diodes for use in the output voltage clamp is detected with the Zener current detecting circuit, and the operating frequency of the charged pump circuit is changed in accordance with increases and decreases in the Zener current Iz, it is possible to prevent the unutilized Zener current Iz from increasing along with the change in the output average current (load current) in the charged pump circuit, and to prevent the average consumed current IDD from increasing as a result of the increase in this Zener current Iz.

BRIEF DESCRIPTION OF THE DRAWINGS

FIGS. 15A and 15B are waveform views showing an operating state of the charged pump circuit shown in FIG. 14.

DESCRIPTION OF THE PREFERRED EMBODIMENTS

Figure 1:
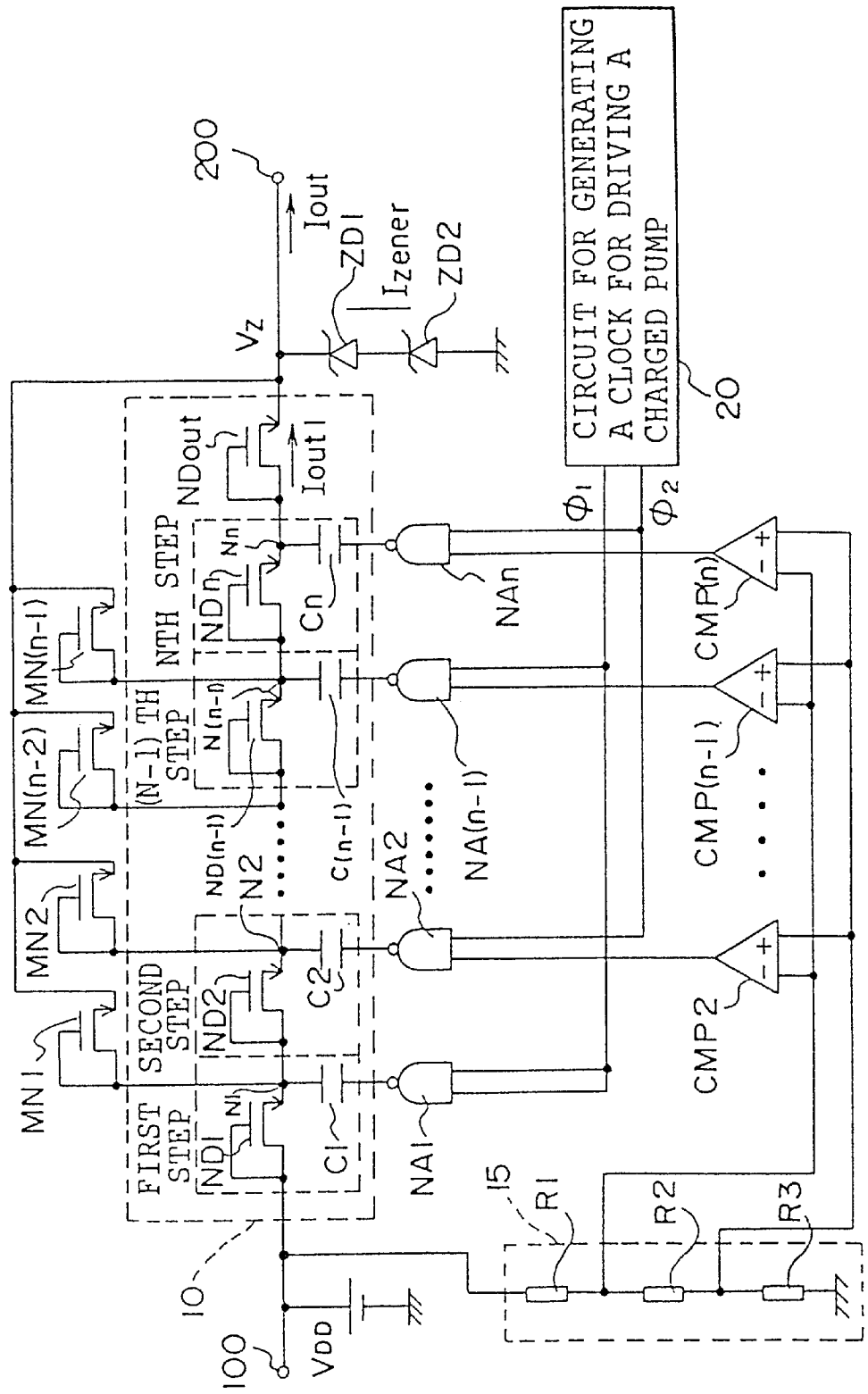
FIG. 1 is a circuit diagram showing a structure of a drive control circuit of a charged pump circuit according to a first embodiment of the invention.

Embodiments of the present invention will be explained in detail hereinbelow by referring to the drawings.

First Embodiment of the Invention

The structure of a drive control circuit of a charged pump circuit according to a first embodiment of the present invention is shown in FIG. 1. In FIG. 1, the charged pump 10 has NMOS diodes ND1 through NDn (n is an integer), NDout, and n capacitors C1 through Cn. NMOS diodes ND1 through NDn (n is an integer) and NDout are connected in series between an input terminal 100 and an output terminal 200. To each of the nodes ND1 through NDn of the NMOS diodes ND1 through NDn, one end of each of the capacitors C1 through Cn is connected while the other end of n capacitors C1 through Cn is connected to an output terminal of NAND gates NA1 through NAn, respectively. Both input terminals of the NAND gate NA1 out of the NAND gates NA1 through NAn are connected in common so that a clock signal φ1 is supplied from the charged pump drive clock generating circuit 20 for preparing clock signals φ1 and φ2 for driving the charged pump circuit 10.

Furthermore, to one of the input terminals of one of the NAND gates NA3, NA5, . . . , NAn−1, the clock signal φ1 is supplied while to one of the input terminals of the NAND gates NA2, NA4, . . . , NAn the clock signal φ2 is supplied from a circuit 20 for generating a clock for driving the charged pump. The other of the input terminals of the NAND gates NA2, NA3, . . . , NAn−1, NAn is connected to each of the output terminals of the comparators CMP2–CMPn which will be described later.

Figure 11:
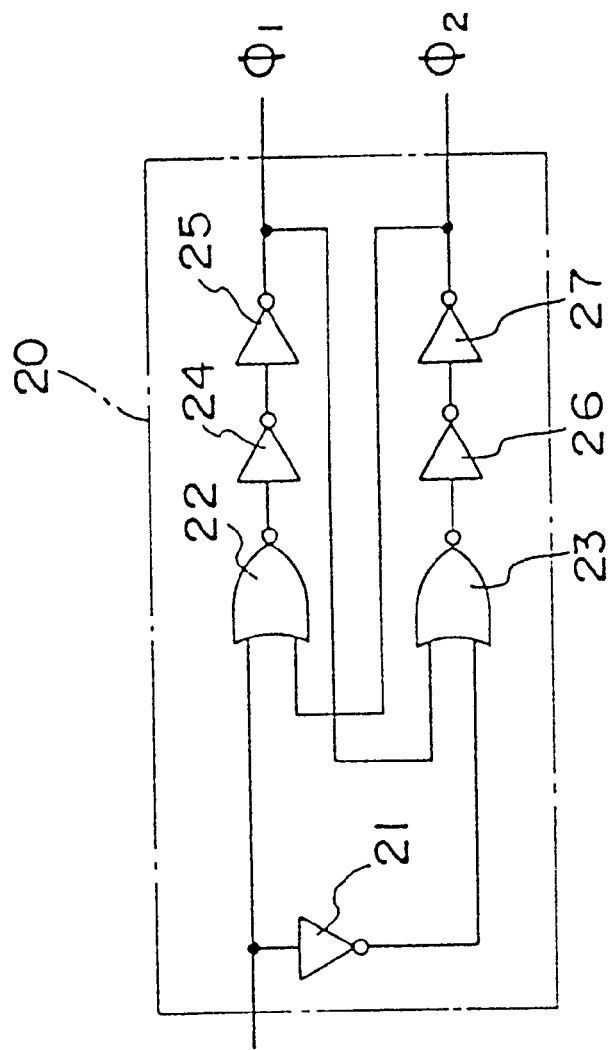
FIG. 11 is a circuit diagram showing a specific structure of a drive clock generating circuit of the charged pump according to each of the embodiments.
Figure 12:
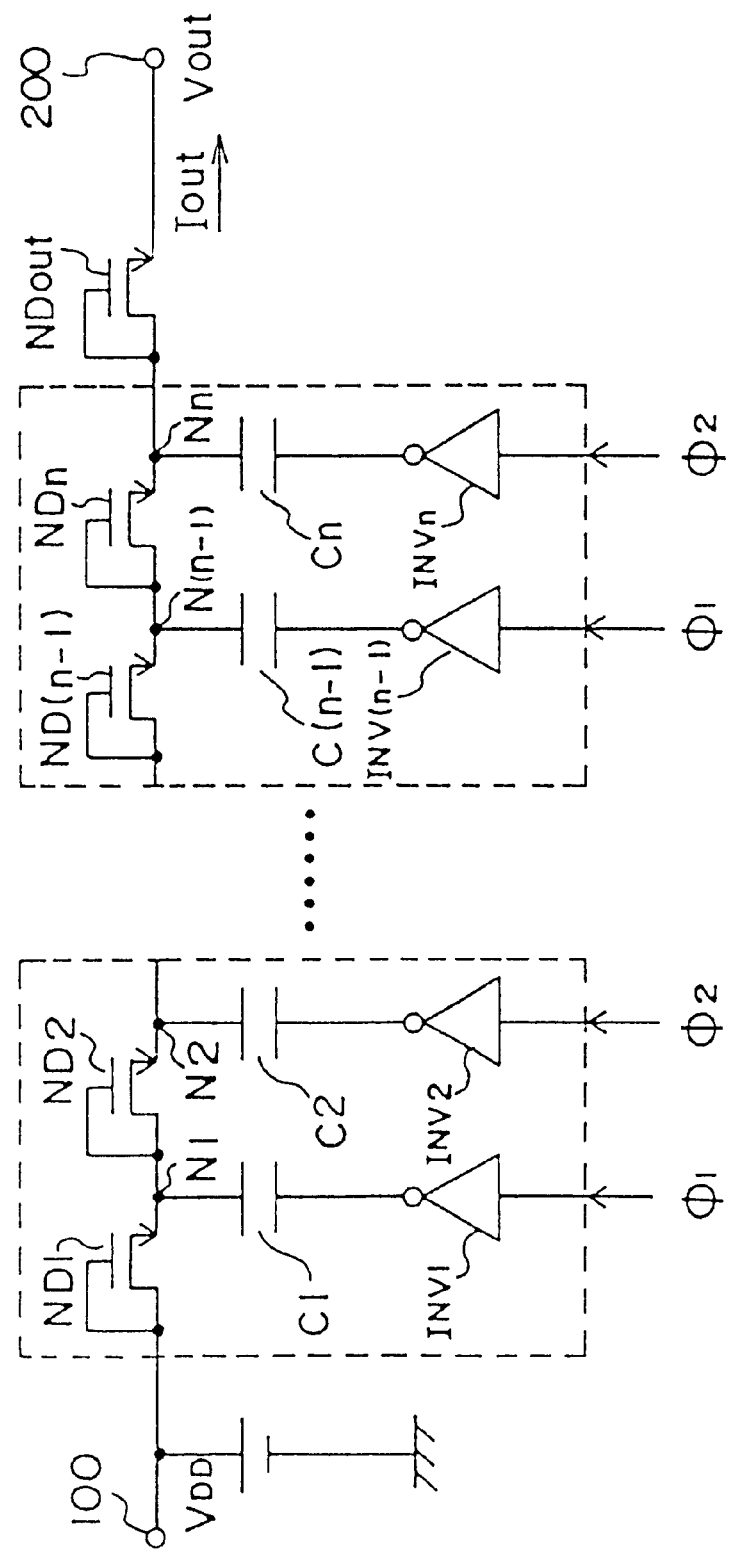
FIG. 12 is a circuit diagram showing one example of a structure of the conventional charged pump circuit.
Figures 13A, 13B:
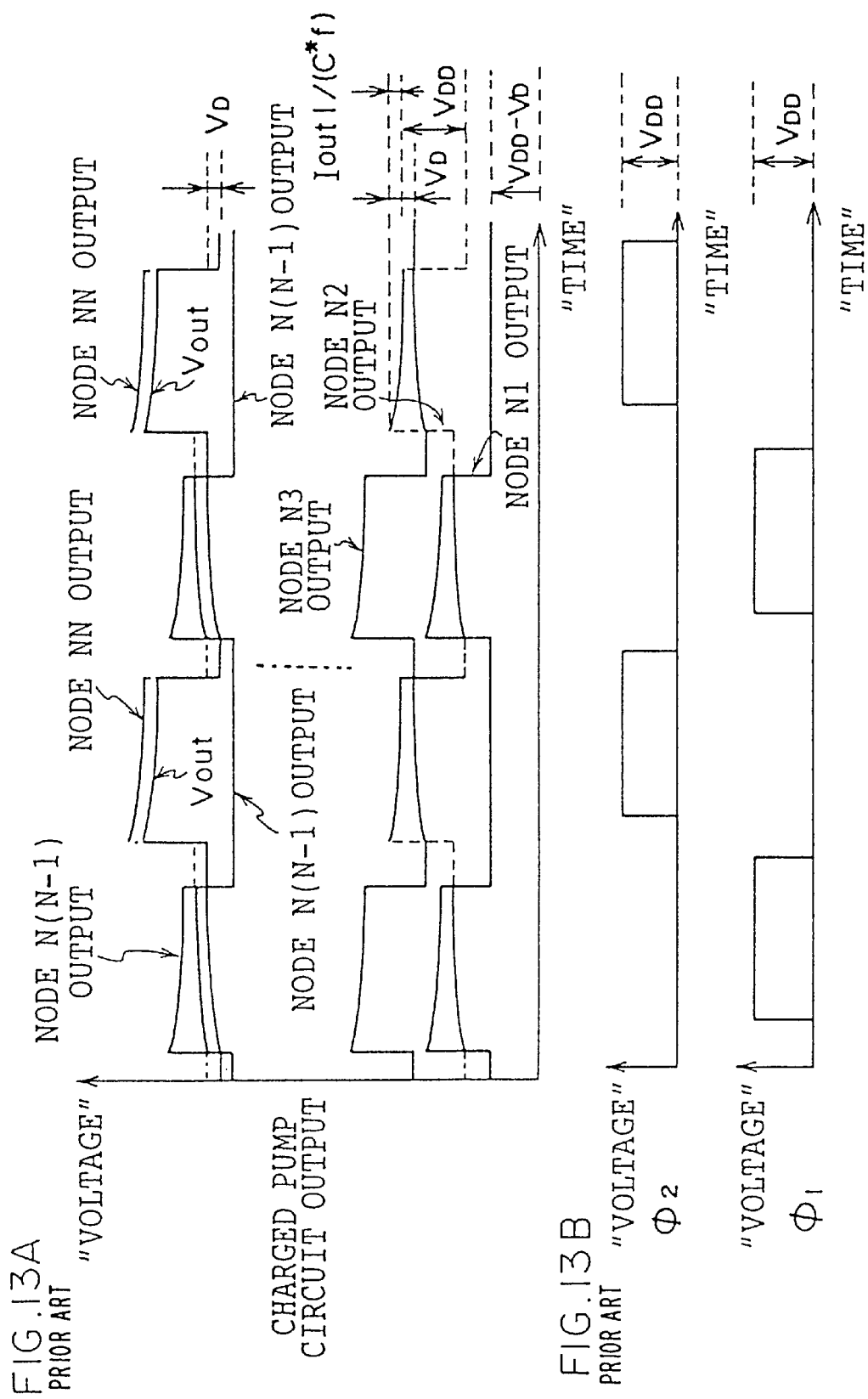
FIGS. 13A, 13B are waveform views showing an operating state of the charged pump circuit shown in FIG. 12.

Specifically, for example, the circuit 20 for generating a clock for driving the charged pump is formed by connecting inverters 21, 24 through 27 as shown in FIG. 11 and NOR gates 22 and 23 as shown in the drawings. A clock pulse having a constant frequency which is generated with an oscillation circuit (not shown) is supplied to the charged pump circuit 10 by generating two kinds of clock signals φ1 and φ2 (refer to FIG. 13(B)) having high level periods which do not overlap each other, and the clock pulse is supplied to the charged pump circuit 10.

The drive control circuit of the charged pump circuit according to the first embodiment comprises a voltage dividing circuit 15 comprising voltage dividing resistors R1, R2 and R3 connected in series between an input terminal 100 of the charged pump circuit 10 and an earth for detecting a power source voltage value, comparators CMP2 through CMPn for fetching a voltage across both terminals of the voltage dividing resistor R2 (a divided voltage value of the power source voltage VDD) and comparing the voltage across both terminals of the resistor R2 with the input offset voltage, NAND gates NA1 through NAn, and NMOS diodes MN1 through MNn−1 connected between each of the nodes N1 through Nn−1 of the NMOS diodes ND1 through NDn−1, and the output terminal 200 of the charged pump circuit 10. The voltage dividing circuit 15 corresponds to a power source voltage detecting circuit of the present invention, the comparators CMP2 through CMPn and the NAND gates NA1 through NAn correspond to the control circuit of the invention, and the NMOS diodes MN1 through MNn−1 correspond to the by-pass circuit of the invention.

Figure 2:
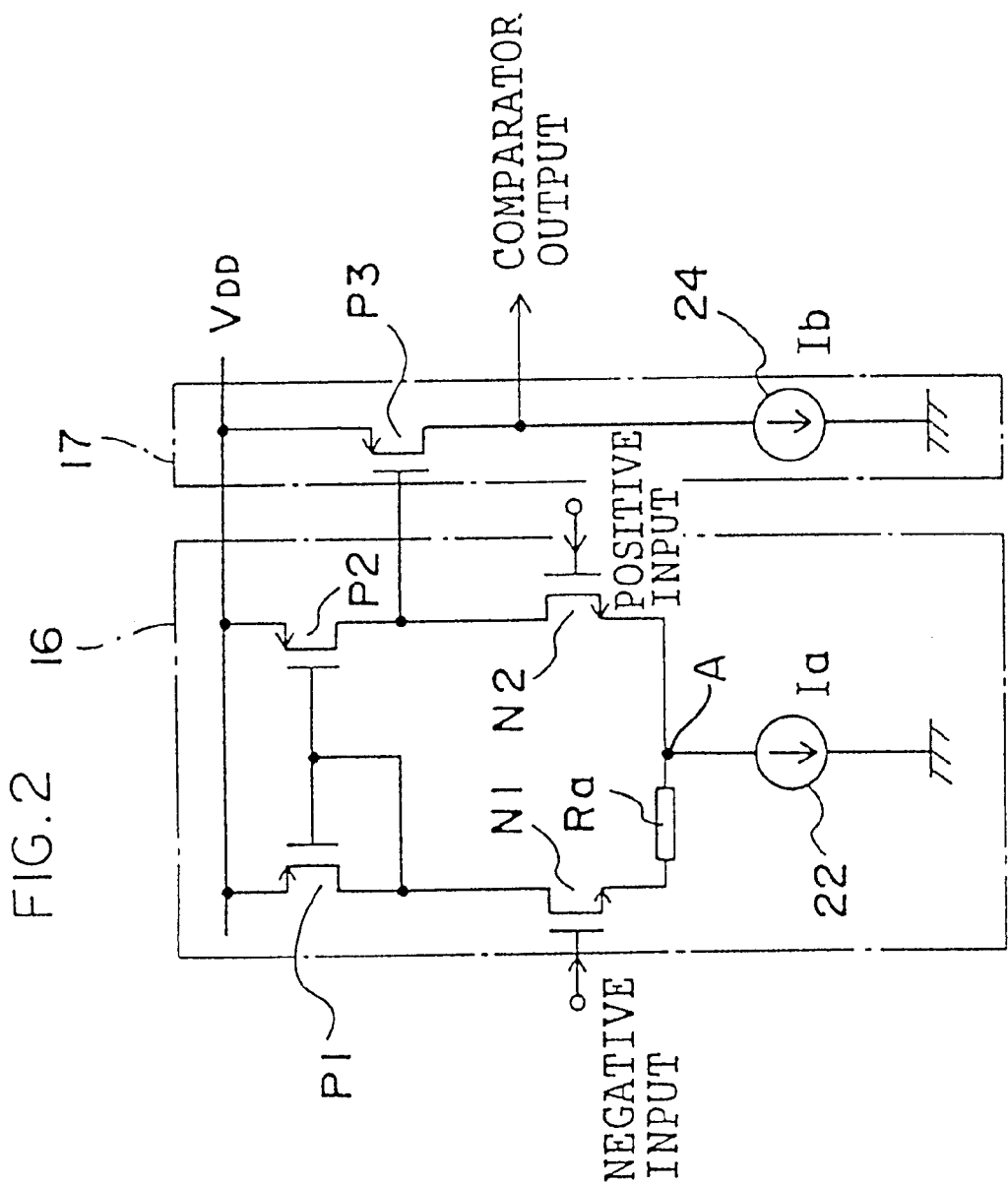
FIG. 2 is a circuit diagram showing a specific structure of a comparator shown in FIG. 1.

An example of the structure of the comparators CMP2 through CMPn is shown in FIG. 2. In FIG. 2, the comparator CMPi (i=2 through n) comprises a differential amplifying circuit 16 comprising PMOS transistors P1 and P2, NMOS transistors N1 and N2, an offset resistor Ra and a constant current source 22, and a buffer 17 comprising PMOS transistor P3 connected to an output side of the differential amplifying circuit 16 and a constant current source 24. A reversed input terminal of the comparator CMPi is connected to a connection point of the voltage dividing resistors R1 and R2, and a non-reversed input terminal is connected to a connection point of the voltage dividing resistors R2 and R3.

In the comparators CMP2 through CMPn, an offset resistor Ra for setting an input offset voltage is connected between a source of the NMOS transistor N1 having a gate connected to the reversed input terminal and point A which constitutes an imaginary earthing point of the differential amplifying circuit 16. A resistance value of the offset resistor Ra is set to a different value in each of the comparators CMP2 through CMPn as described later. In other words, when the resistance value of each of the offset resistors Ra of the comparators CMP2 through CMPn is set to Ra2, Ra3, . . . , Ran−1, Ran respectively, the resistance value of each of the offset resistors is set to a value so that the following relation will be established.

$$Ran < Ran-1 < \ldots < Ra3 < Ra2 \tag{6}$$

In the aforementioned structure, the input voltage which is applied to a portion between the non-reversed input terminal and the reversed input terminal of each of the comparators CMP2 through CMPn is the voltage across both ends of the voltage dividing resistor R2 in the voltage dividing circuit 15. When the voltage across both ends of the voltage dividing resistor R2 is denoted by VR2, the input voltage VR2 will be defined in accordance with the following mathematical formula.

$$VR2 = (R2/(R1+R2+R3)) \cdot VDD \tag{7}$$

On the other hand, as has been already described above, the comparators CMP2 through CMPn have an input offset voltage because the offset resistor Ra is connected between a source of the NMOS transistor N1 having a gate connected to the reversed input terminal and an imaginary earth point A of the differential amplifying circuit 16. Furthermore, since the resistance value of the offset resistor Ra is set to a different value in each of the comparators CMP2 through CMPn, the comparators CMP2 through CMPn have different offset voltages, respectively. When the constant current value which flows into the constant current source 22 of the comparators CMP2 through CMPn is denoted by Ia and the input offset voltages of the comparators CMP2 through CMPn by Vio2 through Vion, the following mathematical formula is established.

$$\left. \begin{array}{l} Vio2 = Ra2 \cdot Ia \\ Vion = Ran \cdot Ia \end{array} \right\} \tag{8}$$

In each of the comparators CMP2 through CMPn, when the input voltage VR2 which is applied to a portion between the non-reversed input terminal and the reversed input terminal becomes larger than the input offset voltage possessed by each of the comparators, the output voltage level changes from a high level to a low level. Consequently, the condition under which the output of each of the comparators changes from the high level to the low level, the following condition is established from the mathematical formulae (7) and (8).

$$\left.\begin{array}{l}\text{Output change condition of the comparator } CMP2\\(R2/(R1+R2+R3))\cdot VDD > Ra2\cdot Ia\\\text{Output change condition of the comparator } CMPn\\(R2/(R1+R2+R3))\cdot VDD > Ran\cdot Ia\end{array}\right\} \quad (9)$$

Since the values of the offset resistors Ra2 through Ran of the comparators CMP2 through CMPn are dictated by the relation of Ran<Ra(n−1)< . . . <Ra2 as shown in the mathematical formula (6), the comparators CMP2 through CMPn are operated in such a manner that the output of the comparators CMP2 through CMPn changes from a high level to a low level in an order of CMPn→CMP(n−1)→ . . . →CMP2 with an increase in the power source voltage VDD from the mathematical expression (9).

When the power source voltage VDD is set as a value within the range of a normal voltage level, in other words, when the voltage VR2 across both terminals of the voltage dividing resistors R2 falls within the relation of VR2<Ran·Ia, the NMOS transistor N2 and the PMOS transistor P3 shown in FIG. 2 are turned on in all of the comparators CMP2 through CMPn so that the output of each of the comparators is set to a high level.

When the output of all the comparators CMP2 through CMPn is set to a high level, the charged pump circuit 10 shown in FIG. 1 is operated from the first step up to the nth step, and is operated in the same manner as the conventional charged pump circuit shown in FIG. 14 with the result that the output voltage of the charged pump circuit 10, a Zener current which flows through the Zener diodes ZD1 and ZD2, and the average consumed current IDD will be defined in the following manner.

$$Vz=VDD+n\cdot(VDD-VD-(Iout+Iz)/(C\cdot f))-VD \quad (10)$$

$$Iz=(Vout-Vz)/n\cdot C\cdot f \quad (11)$$

$$IDD=n\cdot(Iout+Iz) \quad (12)$$

Here, Vout will be defined in the following manner.

$$Vout=VDD+n\cdot(VDD-VD-Iout/(C\cdot f))-VD \quad (13)$$

When the output of the comparator CMPn changes from the high level to the low level along with the increase in the power source voltage VDD, the nth step of the charged pump circuit 10 serves as one of the inputs of the NAND gate NAn for driving the nth step of the output of the comparator CMPn, the output of the NAND gate NAn continues to be set to a high level irrespective of the clock signal φ2 with the result that the operation of the nth step of the charged pump circuit 10 is suspended. At this time, the first step to the (n−1)th step of the charged pump circuit are operated, the potential at the node Nn−1 becomes higher than the potential at the output terminal 200, and the NMOS diode MNn−1 is by-passed in order to provide a conducting state with the result that the output voltage at the (n−1)th step of the charged pump circuit 10 is output to the output terminal 200 of the charged pump circuit 10 via the NMOS diode MN(n−1).

The threshold voltage of the NMOS diode (MN1 through MNn−1) is set to VD which is the same as the threshold voltage of the NMOS diode ND1 through NDn and NDout, the output voltage Vz of the charged pump circuit 10 in the case of the suspension of the operation of the nth step, the Zener current Iz which flows through the Zener diodes ZD1 and ZD2 and the average consumed current IDD will be defined in the following manner in the charged pump circuit 10.

$$Vz=VDD+(n-1)\cdot(VDD-VD-(Iout+Iz)/(C\cdot f))-VD \quad (14)$$

$$Iz=(Vout-Vz)/(n-1)c\cdot f \quad (15)$$

$$IDD=(n-1)\cdot(Iout+Iz) \quad (16)$$

Here, Vout will be defined in the following manner.

$$Vout=VDD+(n-1)\cdot(VDD-VD-Iout/(C\cdot f))-VD \quad (17)$$

Furthermore, when the output of the comparator CMP(n−1) changes from a high level to a low level along with the increase in the power source voltage VDD, the operation of the (n−1)th step of the charged pump circuit 10 is suspended after the nth step thereof with the result that the output voltage Vz of the charged pump circuit 10, the Zener current Iz which flows through the Zener diodes ZD1 and ZD2 and the average consumed current IDD will be defined in the following manner.

$$Vz=VDD+(n-2)\cdot(VDD-VD-(Iout+Iz)/(C\cdot f))-VD \quad (18)$$

$$Iz=(Vout-Vz)/(n-2)\cdot C\cdot f \quad (19)$$

$$IDD=(n-2)\cdot(Iout+Iz) \quad (20)$$

Here, Vout will be defined in the following manner.

$$Vout=VDD+(n-2)\cdot(VDD-VD-Iout/(C\cdot f))-VD \quad (21)$$

In this manner, the output of the comparator CMP2 through CMPn changes from a high level to a low level in an order of CMP(n)→CMP(n−1)→ . . . →CMP2 with an increase in the power source voltage VDD, and the operation of the charged pump circuit 10 is suspended in an order of nth step→(n−1)th step→ . . . →second step. As a consequence, the nth item representing the number of steps of the charged pump can be changed as n→(n−1)→ . . . →2 with an increase in the power source voltage VDD so that the number of steps of the charged pump circuit which are actually operated can be decreased with an increase in the power source voltage VDD.

The relation between a value of the power source voltage VDD and the number of steps of the charged pump circuit which are actually operated can be freely set by selecting a resistance ratio of the voltage dividing resistors R1, R2, and R3 of the voltage dividing circuit, a value of an offset resistance Ra of each of the comparators, and a constant current value Ia of the constant current source 16.

In the drive control circuit of the charged pump circuit according to the first embodiment of the present invention, the power source voltage VDD is detected with the voltage dividing circuit which serves as a detecting circuit of the power source voltage, the number of drive steps of the charged pump circuit is changed with the comparators CMP2 through CMPn and the NAND gates NA1 through NAn which serve as control circuits in accordance with the detected value of the power source voltage VDD, and the output of the last step out of the drive steps of the charged pump circuit is by-passed to the side of the output terminal of the charged pump circuit in accordance with the change in the number of drive steps of the charged pump circuit with the NMOS diodes MN1 through MN(n−1) which serve as the by-pass circuit with the result that the number of drive steps of the charged pump circuit can be changed in accordance with increases and decreases in the VDD voltage.

Consequently, in the case where the output average current (load current) value Iout in the conventional charged pump circuit is constant, it is possible to inhibit an increase in the unutilized Zener current Iz which flows through the Zener diodes for use in the output voltage clamp at the time of an increase in the power source voltage VDD, and an increase in the average consumed current IDD as a result of an increase in this Zener current Iz.

Furthermore, in the first embodiment of the invention, the number of steps of the charged pump circuit which are actually operated can be changed by steps in accordance with an increase and a decrease of the power source voltage VDD with the result that the power source voltage during the operation of the circuit is constant and is effecitve in the case where the scope of the operation insurance power source voltage of the charged pump circuit is large.

Second Embodiment of the Invention

Figure 3:
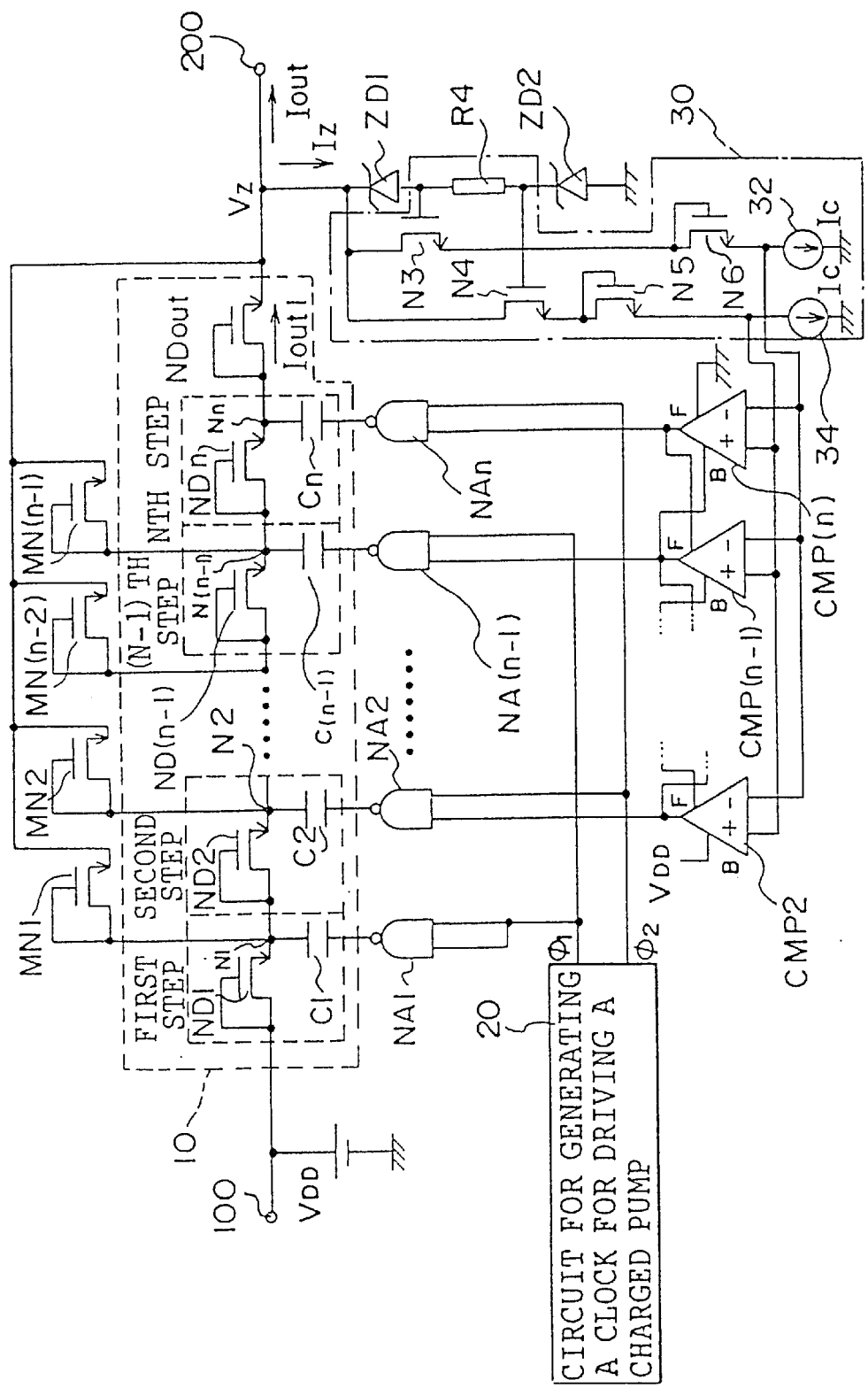
FIG. 3 is a circuit diagram showing a structure of the drive control circuit of the charged pump circuit according to a second embodiment of the invention.

The structure of the charged pump circuit according to a second embodiment of the present invention is shown in FIG. 3. The drive control circuit of the charged pump circuit according to the second embodiment of the present invention is different in structure from the drive control circuit of the charged pump circuit according to the first embodiment of the present invention in that the Zener current detecting circuit 30 for detecting the Zener current flowing through Zener diodes for use in the output voltage clamp is provided so that the number of drive steps of the charged pump circuit 10 is changed with the comparators CMP2 through CMPn and the NAND gates NA1 through NAn in accordance with the detected output of this Zener current detecting circuit 30. Because the rest of the structure is the same for both an explanation thereof is omitted. Note that the structure of the comparators CMP2 through CMPn is different from the first embodiment as will be described later, and the resistance value of the offset resistor for setting the input offset voltage is structured so that the resistance value thereof can be changed over.

The Zener current detecting circuit 30 has a current detecting resistor R4 connected between an anode of the Zener diode ZD1 connected in series between the output terminal 200 of the charged pump circuit 10 and an earth, and a cathode of the Zener diode ZD2, NMOS transistors N3, N4, N5 and N6 and constant current sources 32 and 34. With the NMOS transistor N3, a gate is connected to a connection point between the Zener diode ZD1 and the current detecting resistor R4, a drain is connected to the cathode of the Zener diode ZD1, and a source is connected to the drain of the NMOS transistor N6, respectively. The NMOS transistor N6 is connected as a diode, and the drain thereof is connected to the source of the NMOS transistor N3. The source thereof is earthed via the constant current source 32.

The drain of the NMOS transistor N4 is connected to the drain of the NMOS transistor N3. The gate is connected to a connection point of the current detecting resistor R4 and the Zener diode ZD2, and the source thereof is connected to the drain of the NMOS transistor N5 which is connected as a diode, respectively. The source of the NMOS transistor N5 is grounded via the constant current source 34. Devices are selected in such a manner that the characteristics of the NMOS transistors N3 and N4 are the same, and, at the same time, the characteristics of the NMOS transistors N5 and N6 are the same. The constant number of each of the devices in the Zener current detecting circuit 30 is selected so that the constant current Ic flows into the constant current sources 32 and 34.

The reversed input terminals of the comparators CMP2 through CMPn are connected in common and are connected to a connection point of the source of the NMOS transistor N6 and the constant current source 32. The non-reversed input terminals of the comparators CMP2 through CMPn are connected in common, and are connected to a connection point of the source of the NMOS transistor N5 and the constant current source 34. Each of the output terminals of the comparators CMP2 through CMPn is connected to one of the NAND gates NA2 through NAn for supplying a clock signal to each of the drive steps of the charged pump circuit 10.

Furthermore, the F input terminal of each of the comparators CMP2 through CMP(n−1) is connected to the output terminal of the comparators CMP3 through CMPn at the adjacent rear step thereof. The B input terminal of each of the comparators CMP3 through CMPn is connected to the output terminal of the comparators CMP2 through CMP(n−1) at the adjacent front step thereof. The F input terminal of the comparator CMPn is grounded, and the B input terminal of the comparator CMP2 is connected to the power source line for supplying the power source voltage VDD.

Figure 4:
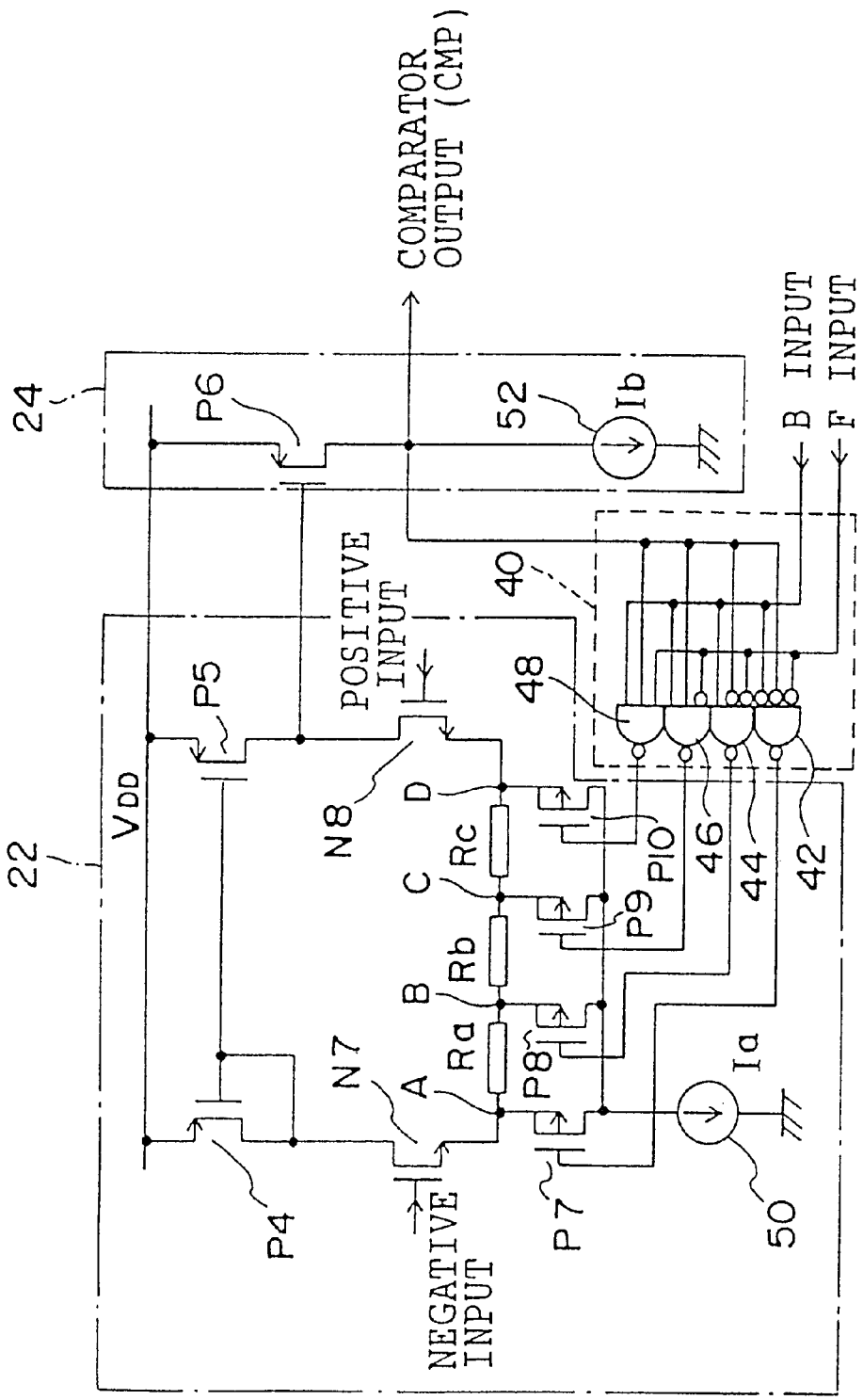
FIG. 4 is a circuit diagram showing a specific structure of the comparator shown in FIG. 3.

A concrete structure of the comparators CMP2 through CMPn is shown in FIG. 4. In FIG. 4, the comparator CMPi (i=2 through n) comprises a differential amplifying circuit 22 comprising PMOS transistors P4 and P5, NMOS transistors N7 and N8, offset resistors Ra, Rb and Rc, PMOS transistors P7 through P10 which serve as a switch, and constant current source 50, a buffer 24 comprising a PMOS transistor P6 connected to the output side of the differential amplifying circuit 22 and a constant current source 52; and a decoder 40 comprising NAND gates 42, 44, 46 and 48 for changing over the input off set voltage of the differential amplifying circuit 22.

In the comparator CMPi (i=2 through n), the offset resistors Ra, Rb and Rc for setting an input offset voltage are connected in series between the source of the NMOS transistor N7 having a gate connected to the reversed input terminal of the comparator CMPi, and the source of the NMOS transistor N8 having a gate connected to the non-reversed input terminal thereof, each of the connection points A, B, C, and D is connected to the sources of the PMOS transistors P7, P8, P9 and P10 respectively, and the drains of the PMOS transistors P7 through P10 are commonly connected and grounded via the constant current source 50. The gates of the PMOS transistors P7 through P10 are connected to each of the output terminals of the NAND gates 42, 44, 46 and 48 of the decoder 40.

The output of the comparator itself and the control data which is input from the F input terminal and the B input terminal are input to the decoder 40.

The sources of the PMOS transistors P4, P5 and P6 are connected to the power source line for supplying a power source voltage VDD. The structure of the comparator CMPi is basically the same as the comparator shown in FIG. 2 except for the fact that the offset resistors Ra, Rb and Rc are constituted in such a manner that the resistors Ra, Rb and Rc can be switched over with the output from the decoder 40.

In the aforementioned structure, as has been already described above, the characteristics of the NMOS transistors N3 and N4 of the Zener current detecting circuit 30 are the same, and the characteristics of the NMOS transistors N5 and N6 are the same so that a drain current Id of the NMOS transistors N3 and N6 is a value of the constant current Ic of the constant current source 32, and a drain current Id of the NMOS transistors N4 and N5 is a value of the constant current Ic of the constant current source 34. Since the value of the constant current Ic of the constant current source 32 and the value of the constant current Ic of the constant current source 34 are the same, the voltage Vgs between the gate and the source of the NMOS transistors N3 and N4 becomes the same and the voltage Vgs between the gate and the source of the NMOS transistors N5 and N6 becomes the same. Consequently, the voltage value between the source of the NMOS transistor N5 and the source of the NMOS transistor N6 becomes equal to the voltage between the terminals of the current detecting resistors R4. In other words, the input voltage which is applied to a portion between the reversed input terminal and the non-reversed input terminal of the comparators CMP2 through CMPn is a voltage between terminals of the current detecting resistor R4. When the voltage is set to VR4, the current which flows through the current detecting resistor R4 is (Iz−2Ic) (Iz is Zener current) with the result that the voltage VR4 between terminals of the current detecting resistor R4 is defined in the following manner with the resistance value of the current detecting resistor R4 being set to R4.

$$VR4 = R4 \cdot (Iz - 2 \cdot Ic) \tag{22}$$

Furthermore, the comparators shown in FIG. 4 are constituted in such a manner that the offset resistors Ra, Rb and Rc are connected in series between the source of the NMOS transistor N7 and the source of the NMOS transistor N8, the imaginary earth points are changed from point A to point D by turning on and off the PMOS transistors P7, P8, P9 and P10 so that the setting of the input offset voltage can be changed. In the case where the constant current value of the constant current source constituting a differential amplifying circuit of the comparator is set to Ia and the resistance values of the offset resistors Ra, Rb and Rc are set to a state represented by the mathematical expression of Ra>Rb+Rc, the offset voltages Vioa through Viod will be defined in the following mathematical expression when each of the points A, B, C and D is defined as imaginary points by referencing to the reversed input terminal depending on the ON and OFF state of the PMOS transistors P7, P8, P9 and P10.

$$\begin{aligned}
&\text{At } P7 = ON, P8\text{-}P10 = OFF : Vioa = -(Ra + Rb + Rc) \cdot Ia \\
&\text{At } P8 = ON, P7, P9, P10 = OFF : Viob = (Ra + Rb - Rc) \cdot Ia \\
&\text{At } P9 = ON, P7, P8, P10 = OFF : Vioc = (Ra + Rb - Rc) \cdot Ia \\
&\text{At } P10 = ON, P7\text{-}P9 = OFF : Viod = (Ra + Rb + Rc) \cdot Ia
\end{aligned} \tag{23}$$

The ON and OFF states of the PMOS transistors P7 through P10 are determined by the output of the comparator (described as CMP output for the sake of convenience), the control data (simply described as F input) which is input from the F input terminal, and the output of the decoder 40 with the control data which is input to the B input terminal serving as an input. The mathematical expressions (23) will be defined in the following manner when the mathematical expression (23) is summarized for each state of the CMP output, the F input and the B input in accordance with the decoder logic of the decoder 40.

$$\begin{aligned}
&\text{At } F \text{ input} = H, CMP \text{ output} = H, B \text{ input} = H : Viod = (Ra + Rb + Rc) \cdot Ia \\
&\text{At } F \text{ input} = L, CMP \text{ output} = H, B \text{ input} = H : Vioc = (Ra + Rb - Rc) \cdot Ia \\
&\text{At } F \text{ input} = L, CMP \text{ output} = L, B \text{ input} = H : Viob = (Ra + Rb - Rc) \cdot Ia \\
&\text{At } F \text{ input} = L, CMP \text{ output} = L, B \text{ input} = L : Vioa = -(Ra + Rb + Rc) \cdot Ia
\end{aligned} \tag{24}$$

In the state in which the output voltage Vz of the charged pump circuit 10 is lower than the sum of the Zener voltages Vz1 and Vz2 of the Zener diodes ZD1 and ZD2 at the time of the start of the operation of the charged pump circuit, and the Zener current Iz hardly flows, namely, in the state in which the voltage VR4 between terminals of the current detecting resistor R4 is set to a relation of VR4≈0V, the output voltage of all the comparators CMP2 through CMPn is set to a high level, and each of the offset voltages Vio2 through Vion of the comparators CMP2 through CMPn at that time can be set in accordance with the following mathematical expression.

$$\begin{aligned}
&Vio2 = (Ra + Rb + Rc) \cdot Ia \\
&\vdots \\
&Vio(n-1) = (Ra + Rb + Rc) \cdot Ia \\
&Vion = (Ra + Rb - Rc) \cdot Ia
\end{aligned} \tag{25}$$

At this time, the input offset voltage Vion of the comparator CMPn is set to a value smaller than the input offset voltage Vio2 through Vio(n−1) of the other comparators CMP2 through CMP(n−1). The output of each of the comparators changes from a high level to a low level when the input voltage VR4 applied to a portion between the non-reversed input terminal and the reversed input terminal becomes larger than the input offset voltage Vio which is set in each of the comparators.

Since the input offset voltage Vion of the comparator CMPn has become smaller than the input offset voltage Vio2 through Vio(n−1) of the other comparators CMP2 through CMP(n−1) is the state described by the mathematical expression (25), the Zener current Iz increases with an increase in the power source voltage VDD and a decrease in the output average current Iout. In the case where the input voltage VR4 of each of the comparators increases, the output of the comparator CMPn changes from a high level to a low level in the very beginning.

Figure 14:
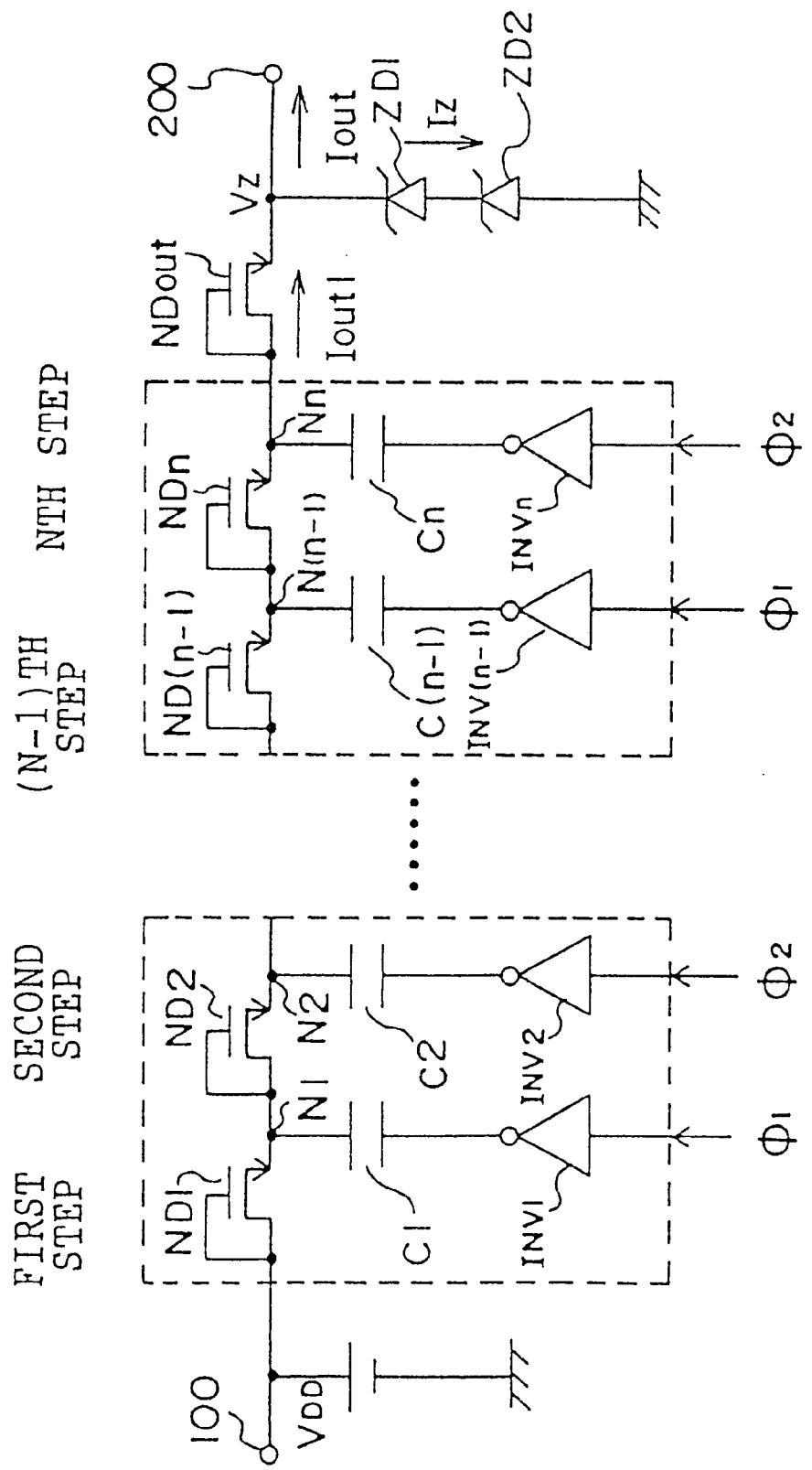
FIG. 14 is a circuit diagram showing another example of a structure of the conventional charged pump circuit.

All the outputs of the comparators CMP2 through CMPn are set to a high level until the output of the comparator CMPn changes from a high level to a low level, and the charged pump circuit 10 is operated all from the first step to the nth step, and can be operated in the same manner as the conventional charged pump circuit shown in FIG. 14 with the result that the output voltage Vz of the charged pump circuit 10, the Zener current Iz which flows through the Zener diodes ZD1 and ZD2, and the average consumed current IDD will be defined in the following manner.

$$Vz = VDD + n \cdot (VDD - VD(Iout + Iz)/(C \cdot f)) - VD \tag{26}$$

$$Iz = (Vout - Vz)/n \cdot C \cdot f \tag{27}$$

$$IDD = n \cdot (Iout + Iz) \tag{28}$$

Here, the Vout will be defined in the following manner.

$$Vout = VDD + n \cdot (VDD - VD - Iout/(C \cdot f)) - VD \tag{29}$$

When the voltage between both terminals of the current detecting resistor R4 increases and the state represented by the mathematical expressions of VR4>Vion (VR4=R4·(Iz−2Ic), and Vion=(Ra+Rb+Rc)·Ia), the output of the comparator CMPn changes from a high level to a low level.

At the nth step of the charged pump circuit 10, the clock signal φ2 is supplied from a circuit 20 for generating a clock for driving the charged pump. Since the output (on a low level) of the comparator CMP(n) serves as the other input of the NAND gate NAn, the operation of the nth step is suspended. At this time, since the first step to the (n−1)th step of the charged pump circuit 10 is operated, the output voltage at the (n−1)th step is output to the output terminal 200 of the charged pump circuit 10 via the NMOS diode MN(n−1). When the threshold voltage of the NMOS diodes NMOS diodes MN1 through MN(n−1) is set to VD which is the same as the threshold voltage of the NMOS diodes ND1 through NDn and the NDout, the output voltage Vz of the charged pump circuit 10, the Zener current Iz which flows through the Zener diodes ZD1 and ZD2 and the average consumed current IDD will be defined in the following manner when the operation of the nth step is suspended in the charged pump circuit 10.

$$Vz=VDD+(n-1)\cdot(VDD-VD-(Iout+Iz)/(C\cdot f))-VD \quad (30)$$

$$Iz=(Vout-Vz)/(n-1)\cdot C\cdot f \quad (31)$$

$$IDD=(n-1)\cdot(Iout+Iz) \quad (32)$$

Here, Vout will be defined in the following manner.

$$Vout=VDD+(n-1)\cdot(VDD-VD-Iout/(C\cdot f))-VD \quad (33)$$

In this case, since the output of the comparator CMPn changes from a high level to a low level, the input offset voltage Vion of the comparator CMPn changes.

Furthermore, since the F input of the comparator CMP(n−1) has changed from a high level to a low level, the input offset voltage Vio(n−1) of the comparator CMP(n−1) also changes. Consequently, the input offset voltages Vio2 through Vion of the comparators CMP2 through CMPn change in the following manner in accordance with the mathematical expressions (23) and (24).

$$\left.\begin{aligned} Vio2 &= (Ra+Rb+Rc)\cdot Ia \\ &\vdots \\ Vio(n-2) &= (Ra+Rb+Rc)\cdot Ia \\ Vio(n-1) &= (Ra+Rb-Rc)\cdot Ia \\ Vion &= (Ra-Rb-Rc)\cdot Ia \end{aligned}\right\} \quad (34)$$

The input offset voltage Vio(n−1) of the comparator CMP(n−1) is smaller than the input offset voltages Vio2 through Vio(n−2) of the other comparators CMP2 through CMP(n−2) excluding the comparator CMPn, and furthermore, the input offset voltage Vion of the comparator CMPn is smaller than the input offset voltage Vio(n−2) of the comparator CMP(n−1). This state continues in the case where the relation between the input voltage VR4 of each of the comparators CMP2 through CMPn, the input offset voltage Vion of the comparator CMPn, and the input offset voltage Vio(n−1) of the comparator CMP(n−1) is defined by the mathematical expression of Vion(=(Ra+Rb+Rc)·Ia) <VR4(=R4·(Iz−2Ic))<Vio(n−1)(=(Ra+Rb+Rc)·Ia).

Supposing that the state represented by the mathematical expression of VR4(=R4·(Iz−2Ic))<Vio(n−1)(=(Ra−Rb−Rc)·Ia) is established, the output of the comparator CMPn changes from a low level to a high level with the result that the relation between the output voltage of the charged pump circuit 10 and the output current thereof is brought back to the state represented by the mathematical expressions (26) through (29), and the input offset voltage Vio2 through Vion of the comparators CMP2 through CMPn is brought back to the state represented by the mathematical expression (25).

Contrary to this, when the voltage VR4 across both terminals of the current detecting resistor R4 increases and the state represented by the mathematical expression of Vio(n−1)(=(Ra+Rb+Rc)·Ia)<VR4(=R4·(Iz−2Ic)) is generated, the output of the comparator CMP(n−1) changes from a high level to a low level. In the (n−1)th step of the charged pump circuit 10, the clock signal φ1 is supplied via one of the input terminals of the NAND gate NA(n−1) from the circuit 20 for generating a clock for driving the charged pump. However, since the output (on a low level) of the comparator CMP(n−1) serves as another input of the NAND gate NA(n−1), the operation of the (n−1) th step itself is suspended. At this time, since the first step to (n−2) step of the charged pump circuit 10 itself is operated, the output voltage at the (n−2)th step is output to the output terminal 200 of the charged pump circuit 10 via the NMOS diode MN(n−2).

In the charged pump circuit 10, the output voltage Vz of the charged pump circuit 10, the Zener current Iz which flows through the Zener diodes ZD1 and ZD2 and the average consumed current IDD will be defined in the following manner in the case where the operation of the (n−1)th step is suspended.

$$Vz=VDD+(n-2)\cdot(VDD-VD-(Iout+Iz)/(C\cdot f))-VD \quad (35)$$

$$Iz=(Vout-Vz)/(n-2)\cdot C\cdot f \quad (36)$$

$$IDD=(n-2)\cdot(Iout+Iz) \quad (37)$$

Here, Vout will be defined in the following manner.

$$Vout=VDD+(n-2)\cdot(VDD-VD-Iout/(C\cdot f))-VD \quad (38)$$

In this case, since the output of the comparator CMP(n−1) has changed from a high level to a low level, the input offset voltage Vio(n−1) of the comparator CMP(n−1) changes. Furthermore, since the F input of the comparator CMP(n−2) has changed from a high level to a low level, the input offset voltage Vio(n−2) of the comparator CMP(n−2) also changes.

Furthermore, the B input of the comparator CMPn has changed from a high level to a low level, the input offset voltage Vion of the comparator CMPn further changes.

Consequently, the input offset voltage Vio2 through Vion of the comparators CMP2 through CMPn changes in the following manner in accordance with the aforementioned mathematical expressions (23) and (24).

$$\left.\begin{aligned} Vio2 &= (Ra+Rb+Rc)\cdot Ia \\ &\vdots \\ Vio(n-3) &= (Ra+Rb+Rc)\cdot Ia \\ Vio(n-2) &= (Ra+Rb-Rc)\cdot Ia \\ Vio(n-1) &= (Ra-Rb-Rc)\cdot Ia \\ Vion &= -(Ra+Rb+Rc)\cdot Ia \end{aligned}\right\} \quad (39)$$

The input offset voltage Vio(n−2) of the comparator CMP(n−2) becomes smaller than the input offset voltage Vio2 through Vio(n−3) of the other comparators CMP2 through CMP(n−3) excluding the comparator CMP(n−1), and, furthermore, the input offset voltage Vio(n−1) of the comparator CMP(n−1) becomes smaller than the input offset voltage Vio(n−2) of the comparator CMP(n−2). The input offset voltage Vion of the comparator CMPn becomes a negative input offset voltage when the reversed input terminal serves as a reference. This state continues in the case where the relation between the input voltage VR4 of each of the comparators, the input offset voltage Vio(n−1) of the comparator CMP(n−1) and the input offset voltage Vio(n−2)

of the comparator CMP(n−2) is set to a state represented by the mathematial expression of Vio(n−1)(=(Ra−Rb−Rc)·Ia)<VR4(=R4·(Iz−2Ic))<Vio(n−2)(=(Ra+Rb−Rc)·Ia).

Supposing that a state represented by the mathematical expression of VR4(=R4·(Iz−2Ic))<Vio(n−1)(=(Ra−Rb−Rc)·Ia) is generated, the output of the comparator CMP(n−1) changes from a low level to a high level so that the relation between the output voltage of the charged pump circuit and the output current thereof is brought back to a state represented by the mathematical expressions (30) through (33) and the input offset voltage Vio2 through Vion of the comparators CMP2 through CMPn is brought back to a state represented by the mathematical expression (34).

Contrary to this, when the voltage VR4 across both terminals of the current detecting resistor R4 increases and the state represented by the mathematical expression of Vio(n−2)(=(Ra+Rb−Rc)<VR4(=R4·(Iz−2Ic), the comparator CMP(n−2) changes from a high level to a low level. As a consequence, the operation of the (n−2)th step of the charged pump circuit 10 is suspended.

As has been explained above, the output of each of the comparators CMP2 through CMPn changes from a high level to a low level in accordance with an increase in the Zener current Iz which flows into the Zener current detecting circuit 30 in an order of CMPn→CMP(n−1)→ . . . →CMP2 with the result that the operation of the charged pump circuit 10 is suspended in an order of the nth step→the (n−1)th step→ . . . →the second step.

Consequently, the nth item representing the number of steps of the charged pump in the relation expression (26) between the output voltage of the charged pump circuit 10 and the output current thereof can be changed in an order of n→(n−1)→ . . . →2 in accordance with an increase in the Zener current Iz, and the number of steps of the charged pump which are actually operated can be changed so that the number is decreased in accordance with an increase in the Zener current Iz. The relation between the current value of the Zener current Iz and the number of steps of the charged pump which are actually operated can be freely set with a resistance ratio of the current detecting resistor R4 of the Zener current detecting circuit 30 as against the offset resistors Ra, Rb and Rc of each of the comparators (CMP2 through CMPn) and the constant current value Ia of the constant current source 50 of each of the comparators.

Since the drive control circuit of the charged pump circuit according to the second embodiment of the invention has a Zener current detecting circuit 30 which serves as a current detecting circuit for detecting a current which flows through the Zener diodes for use in the output voltage clamp connected between an output terminal of the charged pump circuit and an earth, comparators CMP2 through CMPn and NAND gates NA1 through NAn which serve as a control circuit for changing the number of the drive steps of the charged pump circuit in accordance with the detected output of the Zener current detecting circuit 30, and NMOS diodes MN1 through MN(n−1) which serve as a bypass circuit for allowing the output of the last step out of the drive steps to be bypassed to the side of the aforementioned output terminal in accordance with a change in the number of drive steps with the result that the number of the drive steps of the charged pump circuit can be changed in accordance with an increase and a decrease in the Zener current Iz which flows through the Zener diodes for use in the output voltage clamp.

Consequently, in the case where the output average current (load current) value Iout in the conventional charged pump circuit is constant, it is possible to inhibit an increase in an unutilized Zener current Iz which flows through Zener diodes for use in the output voltage clamp at the time of an increase in the power source voltage VDD, and an increase in the average consumed current IDD as a result of an increase in this Zener current Iz.

Furthermore, according to the second embodiment of the invention, since the unutilized current Iz which flows through Zener diodes for use in the output voltage clamp is detected with the Zener current detecting circuit, and the number of drive steps of the charged pump circuit is changed in accordance with an increase and a decrease in the charged pump circuit, it is possible to prevent an increase in the unutilized Zener current Iz increases along with a change in the output average current (load current) value Iout in the charged pump circuit, and an increase in the average consumed current IDD as a result of an increase in this Zener current Iz.

Furthermore, according to the second embodiment of the invention, the number of drive steps of the charged pump circuit can be changed in steps in accordance with a change in a value of the current which flows through Zener diodes for use in the output voltage clamp with the result that the output load current of the charged pump circuit is changed in accordance with the operation power source voltage and is effective in the case where the scope of the operation insurance power source voltage is large.

Third Embodiment of the Invention

Figure 5:
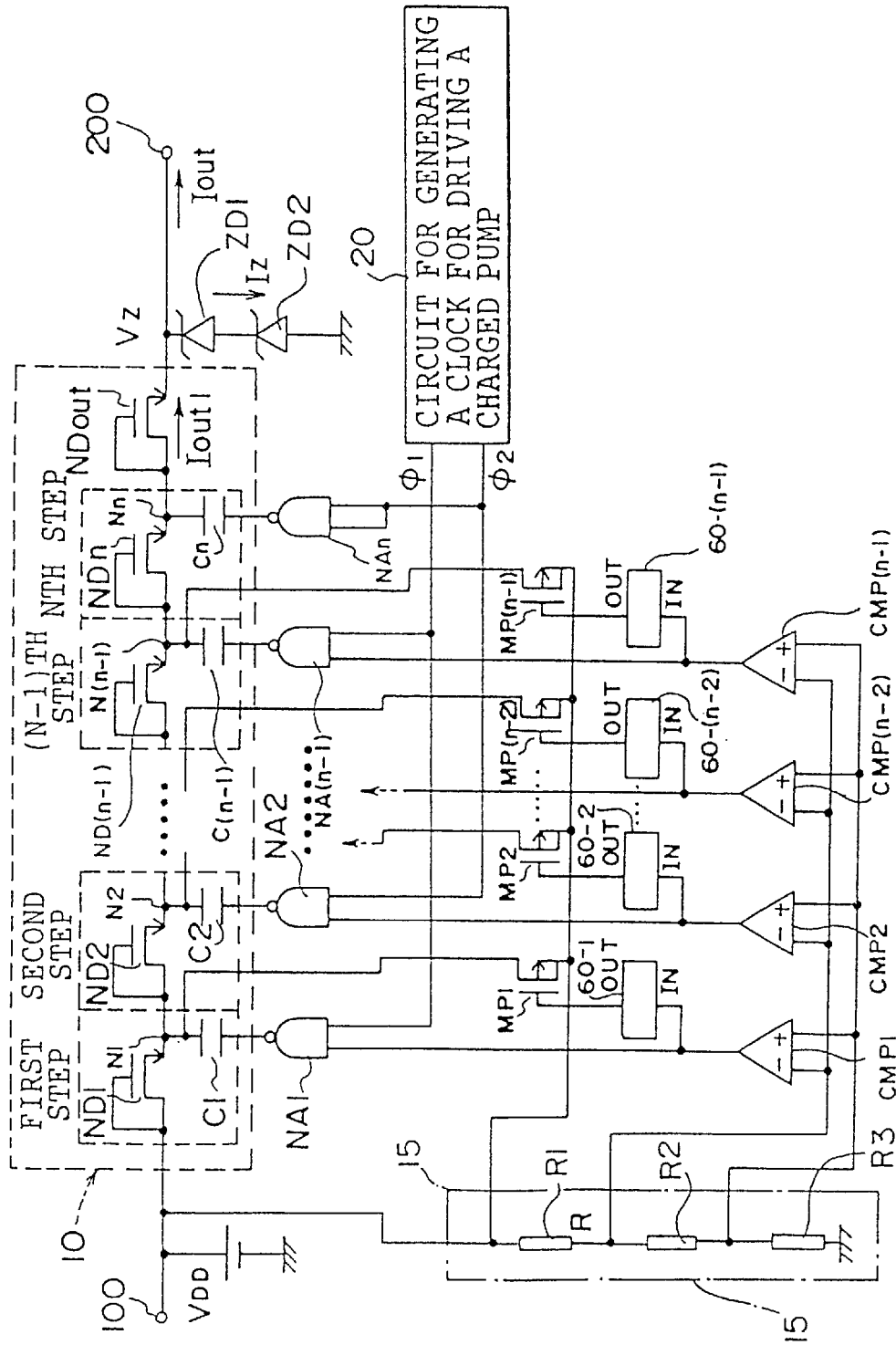
FIG. 5 is a circuit diagram showing a structure of the charged pump circuit according to a third embodiment of the invention.

A structure of the drive control circuit of the charged pump circuit according to a third embodiment of the invention is shown in FIG. 5. The drive control circuit of the charged pump circuit according to the third embodiment of the invention comprises a voltage dividing circuit 15 comprising voltage dividing resistors R1, R2 and R3 connected in series between the input terminal 100 of the charged pump circuit 10 and the earth for detecting a power source voltage value, comparators CMP1 through CMP(n−1) for fetching a voltage (a divided voltage value of the power source voltage VDD) across both terminals of the voltage dividing resistor R2 and comparing the voltage across both terminals of the voltage dividing resistor R2 with and the input offset voltage, NAND gates NA1 through NAn, PMOS transistors MP1 through MP(n−1) connected between each of the nodes N1 through N(n−1) of the NMOS diodes ND1 through ND(n−1) and the input terminal 100 of the charged pump circuit 10, and a level converter 60-1 through 60-(n−1) for converting in level a high level output of the comparators CMP1 through CMP(n−1) into a level of the output voltage Vz of the charged pump circuit.

In each of the PMOS transistors MP1 through MP(n−1), the drain is connected to the side of each of the nodes N1 through N(n−1) of the NMOS diodes ND1 through ND(n−1), the source is connected to the input terminal 100 to which the power source voltage VDD is supplied, and the gate is connected to the output terminal of each of the level converters 60-1 through 60-(n−1) Furthermore, in each of the PMOS transistors MP1 through MP(n−1), the source and the substrate are short-circuited.

The voltage dividing circuit 15 corresponds to a power source voltage detecting circuit of the invention, the comparators CMP1 through CMP(n−1) and the NAND gates NA1 through NAn correspond to the control circuit of the invention, the PMOS transistors MP1 through MP(n−1) and the level converters 60-1 through 60-(n−1) correspond to a by-pass circuit of the invention, respectively.

A structure of the charged pump circuit 10, and the circuit 20 for generating a clock for driving the charged pump is the same as the first embodiment of the invention shown in FIG. 1. The third embodiment is the same as the first embodiment in that the Zener diodes ZD1 and ZD2 for use in the output voltage clamp are connected between the output terminal 200 of the charged pump circuit 10 and the earth. Furthermore, a concrete structure of the comparators CMP1 through CMP(n−1) is shown in FIG. 2 in the same manner as the first embodiment of the invention, and overlapped explanation thereof will be omitted.

Figure 6:
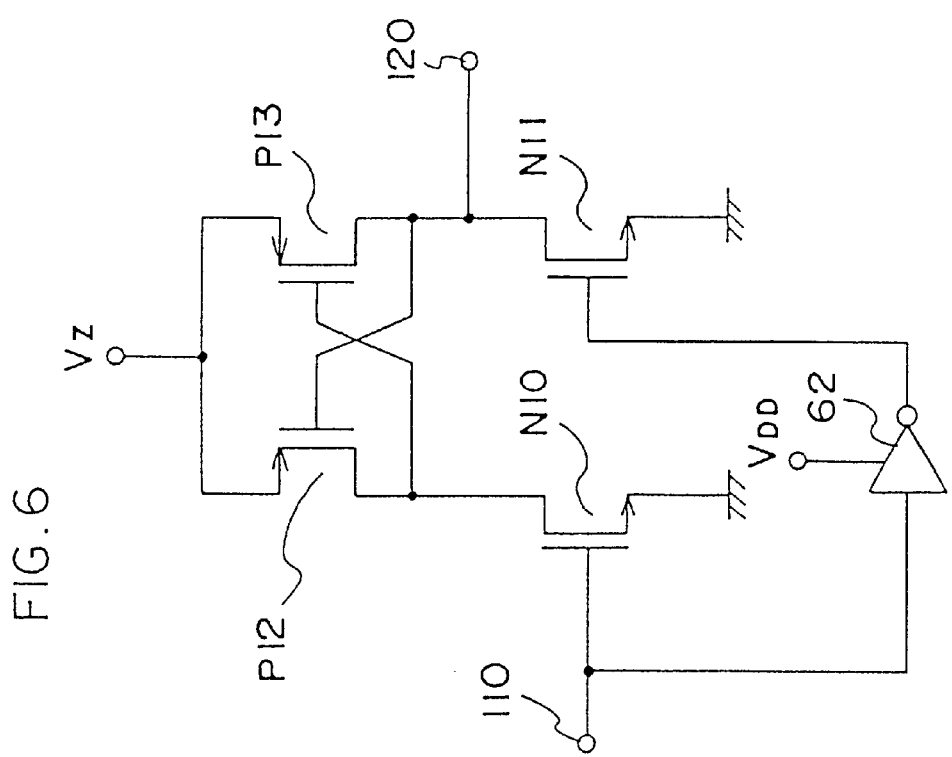
FIG. 6 is a circuit diagram showing a structure of a level conversion circuit shown in FIG. 5.

A concrete structure of the level converters 60-1 through 60-(n−1) will be shown in FIG. 6. In FIG. 6, the sources of the PMOS transistors P12 and P13 are commonly connected, and the output voltage Vz of the charged pump circuit 10 is supplied to the source thereof. The drains of the PMOS transistors P12 and P13 are connected respectively to the drains of the NMOS transistors N10 and N11. The sources of the NMOS transistors N10 and N11 are grounded, the gate of the NMOS transistor N10 is connected to the input terminal 110 to which the output of the comparator is input, and the gate of the NMOS transistor N11 is connected to the output terminal of the inverter 62. The input terminal 110 is connected to the input terminal of the inverter 62. To the inverter 62, the power source voltage VDD is supplied.

Furthermore, the gate of the PMOS transistor P12 is connected to the drain of the NMOS transistor N11, the gate of the PMOS transistor P13 is connected to the drain of the NMOS transistor N10, respectively. The drain of the NMOS transistor N11 is connected to the output terminal 120. The output terminal 120 of each of the level converters 60-1 through 60-(n−1) is connected to each of the gates of the PMOS transistors MP1 through MP(n−1).

In the aforementioned structure, when the resistance values Ra1 through Ra(n−1) of the offset resistor Ra of the comparators CMP1 through CMP(n−1) are set to a value represented by the mathematical expression of Ra(n−1)>Ra(n−2) . . . >Ra1, the output of the comparators CMP1 through CMP(n−1) changed from a high level to a low level in an order of CMP1→ . . . →CMP(n−2)→CMP(n−1) with an increase in the power source voltage VDD contrary to the explanation given in the first embodiment.

All the outputs of the comparators CMP1 through CMP(n−1) are set to a high level, and, furthermore, each of the level converters 60-1 through 60-(n−1) converts a high level output signal (a high level signal having VDD voltage as a reference) of the comparators CMP1 through CMP(n−1) to a high level at the output voltage value Vz of the charged pump circuit 10 with the result that all the PMOS transistors MP1 through MP(n−1) inserted between the input terminal 100 to which the power source voltage VDD is supplied and each of the nodes N1 through N(n−1) of the NMOS diodes ND1 through NDn are set to an OFF state. Consequently, the charged pump circuit 10 is operated in all of the first step through nth step and is operated in the same manner as the conventional charged pump circuit shown in FIG. 14 with the result that the output voltage Vz of the charged pump circuit 10, the Zener current Iz which flows through Zener diodes ZD1 and ZD2, and the average consumed current IDD will be defined in the following manner.

$$Vz=VDD+n\cdot(VDD-VD-(Iout+Iz)/(C\cdot f))-VD \qquad (40)$$

$$Iz=(Vout-Vz)/n\cdot C\cdot f \qquad (41)$$

$$IDD=n\cdot(Iout+Iz) \qquad (42)$$

Here, Vout will be defined in the following manner.

$$Vout=VDD+n\cdot(VDD-VD-Iout/(C\cdot f))-VD \qquad (43)$$

When the output of the comparator CMP1 changes from a high level to a low level with an increase in the power source voltage VDD, the first step of the charged pump circuit 10 is constituted in such a manner that the output of the CMP1 is input to one of the input terminals of the NAND gate NA1 for driving the first step with the result that the operation of the circuit is suspended irrespective of the clock signal φ1 which is input to the other input terminal of the NAND gate NA1.

Furthermore, since the low level signal output from the comparator CMP1 is input to the gate of the PMOS transistor MP1 via the level converter 60-1, the PMOS transistor MP1 is set to an OFF state at this time. As a consequence, since the power source voltage VDD is supplied to the node N1 via the PMOS transistor MP1, the charged pump circuit 10 is operated from the second step through nth step. When it is assumed that the voltage fall of the power source voltage VDD which is generated in the PMOS transistor MP1 cannot be ignored, the output voltage Vz of the charged pump circuit 10 in the case of the suspension of the first step, the Zener current Iz which flows through the Zener diodes ZD1 and ZD2, and the average consumed current IDD will be defined in the following manner.

$$Vz=VDD+(n-1)\cdot(VDD-VD-(Iout+Iz)/(C\cdot f))-VD \qquad (44)$$

$$Iz=(Vout-Vz)/(n-1)\cdot C\cdot f \qquad (45)$$

$$IDD=(n-1)\cdot(Iout+Iz) \qquad (46)$$

Here, Vout will be defined in the following manner.

$$Vout=VDD+(n-1)\cdot(VDD-VD-Iout/(C\cdot f))-VD \qquad (47)$$

Furthermore, when the output of the comparator CMP2 changes from a high level to a low level with an increase in the power source voltage VDD, the operation of the second step is suspended next to the first step, and the output voltage Vz of the charged pump circuit 10, the Zener current Iz which flows through the Zener diodes ZD1 and ZD2, and the average consumed current IDD will be defined in the following manner.

$$Vz=VDD+(n-2)\cdot(VDD-VD-(Iout+Iz)/(C\cdot f))-VD \qquad (48)$$

$$Iz=(Vout-Vz)/(n-2)\cdot C\cdot f \qquad (49)$$

$$IDD=(n-2)\cdot(Iout+Iz) \qquad (50)$$

Here, Vout will be defined in the following manner.

$$Vout=VDD+(n-2)\cdot(VDD-VD-Iout/(C\cdot f))-VD \qquad (51)$$

In this manner, the output of the comparator CMP1 through CMP(n−1) changes from a high level to a low level in an order of $$CMP1 \to CMP2 \to \ldots \to CMP(n-1)$$

with an increase in the power source voltage VDD with the result that the operation of the charged pump circuit 10 is suspended in an order of the first step→the second step→ . . . →(n−1)th step. As a consequence, the n item representing the number of steps of the charged pump can be changed in an order of n→(n−1)→ . . . →2 along with an increase in the power source voltage VDD, and the number of steps of the charged pump which are actually operated can be decreased along with an increase in the power source voltage VDD.

The relation between the value of the power source voltage VDD and the number of steps of the charged pump which are actually operated can be freely set by selecting a resistance ratio of the voltage dividing resistors R1, R2 and R3 of the voltage dividing circuit 15, a value of the offset resistance Ra of each of the comparators, and the constant current value Ia of the constant current source 16.

The drive control circuit of the charged pump circuit according to the third embodiment of the invention has a voltage dividing circuit 15 which serves as a power source detecting circuit for detecting the power source voltage VDD, comparators CMP1 through CM(n−1) and the NAND gates NA1 through NAn which serve as a control circuit for changing the number of drive steps of the charged pump circuit in accordance with the detected output of the voltage dividing circuit 15, PMOS transistors MP1 through MP(n−1) which serve as a by-pass circuit for allowing the aforementioned power source voltage to be by-passed in such a manner that the voltage is supplied to the input side at the first step out of the drive steps in accordance with a change in the number of drive steps of the charged pump circuit and level converters 60-1 through 60-(n−1) with the result that the number of drive steps of the charged pump can be changed in accordance with the increase and decrease of the power source voltage VDD.

Consequently, in the case where the output average current (load current) value Iout in the conventional charged pump circuit is constant, it is possible to inhibit an increase in an unutilized Zener current Iz which flows through the Zener diodes for use in the output voltage clamp at the time of an increase in the power source voltage VDD, and an increase in the average consumed current IDD as a result of an increase of this Zener current Iz.

In the case where all the steps of the charged pump circuit are operated in the drive control circuit of the charged pump circuit according to the first embodiment of the invention, a high voltage is applied to a portion between the source and the drain of the NMOS transistor MN1 which constitutes a by-pass circuit with the result that it becomes necessary to take measures to provide a large area which is grounded from the device periphery of the NMOS transistor MN1 so that NPN bipolar transistor which the NMOS transistor MN1 has in a parasitic manner is not turned on with a substrate leak of the NMOS transistor MN1.

On the other hand, according to the third embodiment, in the case where all the steps of the charged pump circuit are operated, it is the PMOS transistor MP(n−1) that a high voltage is applied to a portion between the drain and source thereof. In this manner, there is an advantage in that it ceases to happen that the parasitic NPN bipolar transistor is turned on and operated with the substrate leak simply because it is the PMOS transistor that a high voltage is applied to a portion between the drain and the source. Thus, the third embodiment is advantageous in the case where an endurance against pressure in the NMOS transistor is not sufficient against the output voltage of the charged pump circuit.

Fourth Embodiment of the Invention

Figure 7:
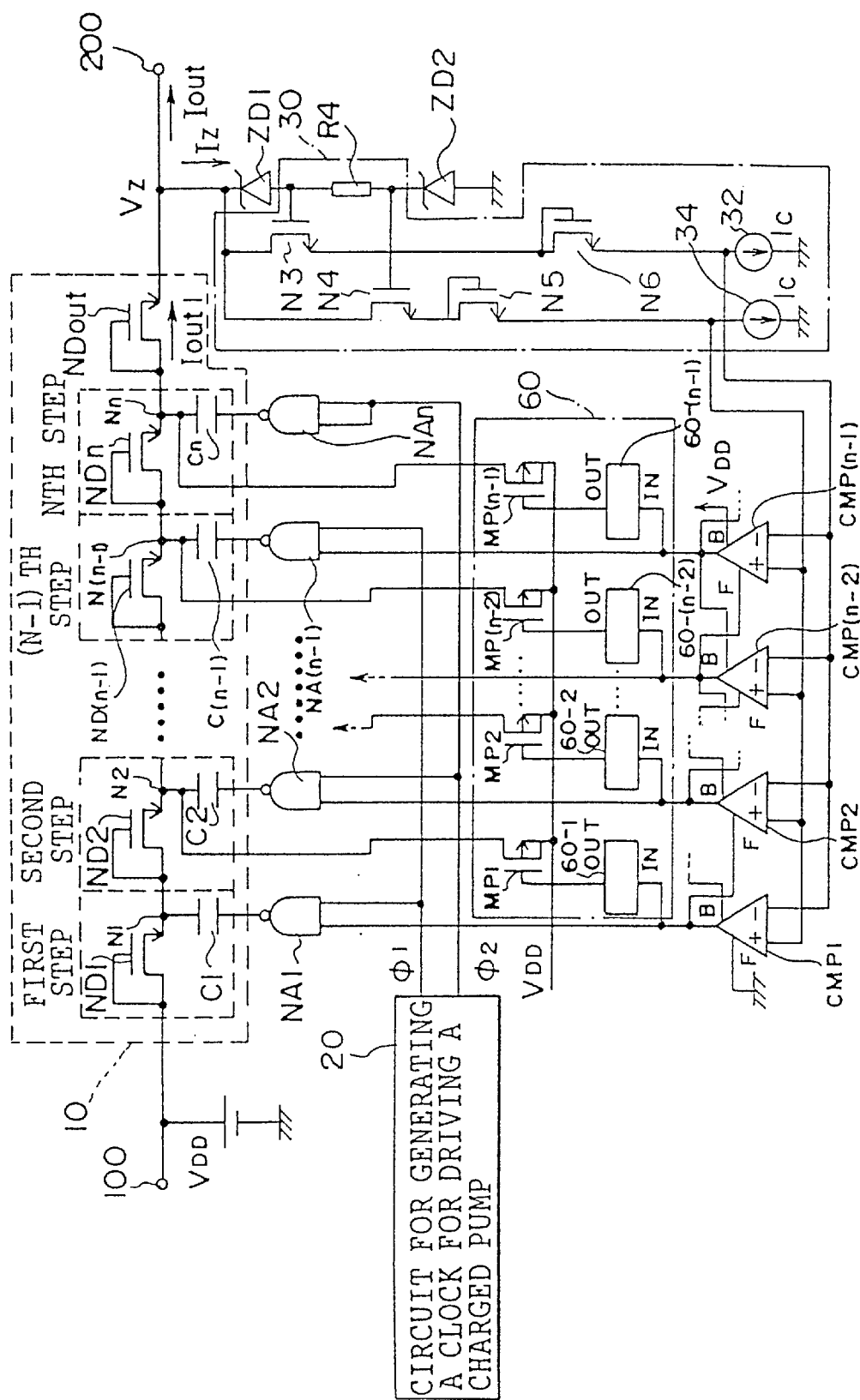
FIG. 7 is a circuit diagram showing a structure of the drive control circuit of the charged pump circuit according to a fourth embodiment of the invention.

A structure of the drive control circuit of the charged pump circuit according to a fourth embodiment of the invention is shown in FIG. 7. The drive control circuit of the charged pump according to the fourth embodiment of the invention has a Zener current detecting circuit 30 for detecting a Zener current which flows through the Zener diodes for use in the output voltage clamp, comparators CMP1 through CMP(n−1) for comparing the detected output of the Zener current detecting circuit 30 and the input offset voltage, NAND gates NA1 through NAn, PMOS transistors MP1 through MP(n−1) connected between each of the nodes N2 through Nn of the NMOS diodes ND2 through NDn and the input terminal 100 of the charged pump circuit 10, and level converters 60-1 through 60-(n−1) for converting the high level output of the comparators CMP1 through CMP(n−1) to a level of the output voltage Vz of the charged pump circuit 10.

In each of the PMOS transistors MP1 through MP(n−1), the drain is connected to the side of each of the nodes N2 through Nn of the NMOS diodes ND2 through NDn, and the source is connected to the input terminal 100 to which the power source voltage VDD is supplied, and the gate is connected to the output terminal of each of the level converters 60-1 through 60-(n−1). Furthermore, in each of the PMOS transistors MP1 through MP(n−1), the source and the substrate thereof are short-circuited.

Each of the output terminals of the comparators CMP1 through CMP(n−1) is connected to one of the input terminals of the NAND gates NA1 through NA(n−1). To the other input terminals, either the clock signal of or the clock signal φ2 is supplied from the circuit 20 for generating a clock for driving the charged pump.

The structures of the charged pump circuit 10, and the circuit 20 for generating a clock for driving the charged pump are the same as the counterparts of the first embodiment. The structure of the fourth embodiment is the same as the counterpart of the first embodiment in that the zener diodes ZD1 and ZD2 for use in the output voltage clamp are connected between the output terminal 200 of the charged pump circuit 10 and the earth. Therefore, overlapped explanation thereof will be omitted.

Furthermore, concrete structures of the Zener current detecting circuit 30 and the comparators CMP1 through CMP(n−1) are the same as the counterparts of the second embodiment. At the same time, since the structure of level converters 60-1 through 60-(n−1) is the same as the counterpart of the third embodiment, the structure of the Zener current detecting circuit 30 is the same as the structure shown in FIG. 3, the structure of the comparators CMP1 through CMP(n−1) is the same as the counterpart shown in FIG. 4, and the structure of level converters 60-1 through 60-(n−1) is the same as the counterpart shown in FIG. 6, the same components are denoted by the same reference numerals, and overlapped explanation thereof will be omitted.

The structure of the comparators CMP1 through CMP(n−1) is the same as the structure shown in FIG. 4. However, in each of the comparators according to the fourth embodiment, the connection relation between the B input terminal and the F input terminal to which control data is input for switching over the resistance values of the offset resistors for setting the input offset voltage is different from the drive control of the second embodiment of the invention shown in FIG. 3. In other words, in the drive control circuit according to the fourth embodiment, as shown in FIG. 7, each of the B input terminals of the comparators CMP1 through CMP(n−2) is connected to the output terminal of the comparators CMP2 through CMP(n−1) at the adjacent rear steps. Each of the F input terminals of the comparators CMP2 through CMP(n−1) is connected to the output terminal of the comparators CMP1 through CMP(n−2) at the adjacent front step. The F input terminal of the comparator CMP1 is grounded. The B input terminal of the comparator CMP(n−1) is connected to the power source line for supplying the power source voltage.

The comparators CMP1 through CMP(n−1) are constituted in such a manner that the output state changes in accordance with at least one of the detected output of the Zener current detecting circuit 30 and the power source voltage thereof.

The Zener current detecting circuit 30 corresponds to the current detecting circuit of the invention, the comparators CMP1 through CMP(n−1) and the NAND gates NA1 through NA(n−1) correspond to the control circuit of the invention, and the PMOS transistors MP1 through MP(n−1) and the level converters 60-1 through 60-(n−1) correspond to the by-pass circuit of the invention, respectively.

In the aforementioned structure, in the same manner as the Zener current detecting circuit 30 according to the second embodiment of the invention, the input voltage which is applied to a portion between the reversed input terminal and the non-reversed input terminal of the comparators CMP1 through CMP(n−1) is a voltage between both terminals of the current detecting resistor R4, and the input voltage VR4 of the comparator CMP1 through CMP(n−1) will be defined in the following manner when the input voltage is denoted by VR4.

$$VR4 = R4 \cdot (Iz - 2 \cdot Ic) \tag{52}$$

At the time of the start of the operation, the output voltage Vz of the charged pump circuit 10 is lower than the sum of the Zener currents Vz1 and Vz2 of the Zener diodes ZD1 and ZD2. In the state in which the Zener current Iz hardly flows, namely, in the state in which the voltage VR4 across both terminals of the current detecting resistor R4 is represented by the mathematical expression of VR4≈0V, the output voltage of all the comparators CMP1 through CMP(n−1) is set to a high level, and each of the input offset voltages Vio1 through Vio(n−1) of the comparators CMP1 through CMP(n−1) at that time will be defined in the following manner.

$$\left.\begin{array}{l} Vio1 = (Ra + Rb - Rc) \cdot Ia \\ \vdots \\ Vio(n-2) = (Ra + Rb + Rc) \cdot Ia \\ Vio(n-1) = (Ra + Rb + Rc) \cdot Ia \end{array}\right\} \tag{53}$$

At this time, the input offset voltage Vio1 of the comparator CMP1 is set to a value smaller than the input offset voltages Vio2 through Vio(n−1) of other comparators CMP2 through CMP(n−1). When the input voltage VR4 which is applied to a portion between the non-reversed input terminal and the reversed input terminal becomes larger than the input offset voltage Vio set in each of the comparators, the output of each of the comparators changes from a high level to a low level.

In the state represented by the mathematical expression (53), the input offset voltage Vio1 of the comparator CMP1 becomes smaller than the input voltage Vio2 through Vio(n−1) of the other comparators CMP2 through CMP(n−1) with the result that the output of the comparator CMP1 changes from a high level to a low level in the very beginning in the case where the Zener current Iz has increased and the input voltage VR4 of each of the comparators has increased as a result of an increase in the power source voltage VDD and a decrease in the output average current Iout.

Until the output of the comparator CMP1 changes from a high level to a low level, the output of the comparators CMP1 through CMP (n−1) are all set to a high level. Furthermore, each of the level converters 60-1 through 60-(n−1) convert the high level output voltage (high level signals which references the VDD voltage) of the comparators CMP1 through CMP(n−1) to a high level at the output voltage value with the result that the PMOS transistors MP1 through MP(n−1) which are inserted between the input terminal to which the power source voltage VDD is supplied and each of the nodes N2 through Nn of the NMOS diodes ND2 through NDn are all set to an off state. Consequently, the charged pump circuit 10 is operated all from the first step to the nth step. The charged pump circuit 10 is operated in the same manner as the conventional charged pump circuit shown in FIG. 14 with the result that the output voltage Vz of the charged pump circuit 10, the Zener current Iz which flows through the Zener diodes ZD1 and ZD2 and the average consumed current IDD will be defined in the following manner.

$$Vz = VDD + n \cdot (VDD - VD - (Iout + Iz)/(C \cdot f)) - VD \tag{54}$$

$$Iz = (Vout - Vz)/n \cdot C \cdot f \tag{55}$$

$$IDD = n \cdot (Iout + Iz) \tag{56}$$

Here, Vout will be defined in the following manner.

$$Vout = VDD + n \cdot (VDD - VD - Iout/(C \cdot f)) - VD \tag{57}$$

The voltage VR4 across both terminals of the current detecting resistor R4 which is an input voltage of the comparators CMP1 through CMP(n−1) increases to be set to a state represented by the mathematical expression of VR4>Vio1 (VR4=R4·(Iz−2Ic), and Vio1=(Ra+Rb+Rc)·Ia), the output of the comparator CMP1 changes from a high level to a low level.

At the first step of the charged pump circuit 10, a clock signal φ1 is supplied via one of the input terminals of the NAND gate NA1 from the circuit 20 for generating a clock for driving the charged pump. However, since the output (on a low level) of the comparator CMP1 serves as the other input of the NAND gate NA1, the operation of the first step of charged pump circuit 10 is suspended.

Furthermore, since the output (on a low level) of the comparator CMP1 is input to the gate of the PMOS transistor MP1 via the level converter 60-1, the PMOS transistor MP1 is turned on at this time. As a consequence, since the power source voltage VDD is supplied to the node N2 of the NMOS diode ND2 via the PMOS transistor MP1, the operation of the charged pump circuit is set to a stage of operation from the second step to the nth step. When it is assumed that the voltage fall of the power source voltage VDD which is generated at the PMOS transistor MP1 can be ignored, the output voltage Vz of the charged pump circuit 10, the Zener current Iz, and the average consumed current IDD will be defined in the following manner in the case where the operation of the first step is suspended.

$$Vz = VDD + (n-1) \cdot (VDD - VD - (Iout + Iz)/(C \cdot f)) - VD \tag{58}$$

$$Iz = (Vout - Vz)/(n-1) \cdot C \cdot f \tag{59}$$

$$IDD = (n-1) \cdot (Iout + Iz) \tag{60}$$

Here, Vout will be defined in the following manner.

$$Vout = VDD + (n-1) \cdot (VDD - VD - Iout/(C \cdot f)) - VD \tag{61}$$

In this case, since the output of the comparator CMP1 has changed from a high level to a low level, the input offset voltage Vio1 of the comparator CMP1 changes.

Furthermore, since the F input of the comparator CMP2 has changed from a high level to a low level, the input offset voltage Vio2 of the comparator CMP2 also changes. Consequently, the input offset voltages Vio1 through Vio(n−1) of the comparator CMP1 through CMP(n−1) change in the following manner as shown below in accordance with the mathematical expressions (23) and (24).

$$\left.\begin{aligned} Vio(n-1) &= (Ra + Rb + Rc) \cdot Ia \\ &\vdots \\ Vio3 &= (Ra + Rb + Rc) \cdot Ia \\ Vio2 &= (Ra + Rb - Rc) \cdot Ia \\ Vio1 &= (Ra - Rb - Rc) \cdot Ia \end{aligned}\right\} \quad (62)$$

The input offset voltage Vio2 of the comparator CMP2 becomes smaller than the input offset voltage Vio3 through Vio(n−1) of the other comparators CMP3 through CMP(n−1) excluding the comparator CMP1, and, at the same time, the input offset voltage Vio1 of the comparator CMP1 becomes smaller than the input offset voltage Vio2 of the comparator CMP2. This state continues in the case where the relation between the input voltage VR4 of the comparators CMP1 through CMP(n−1), the input offset voltage Vion of the comparator CMP1, and the input offset voltage Vio2 of the comparator CMP2 stands in a relation of Vio1(=(Ra−Rb−Rc)·Ia)<VR4(=R4·(Iz−2Ic) )<Vio2(=(Ra+Rb−Rc)·Ia).

Supposing that the state represented by the mathematical expression of VR4=(R4·(Iz−2Ic))<Vio1(=(Ra−Rb−Rc)·Ia) is generated, the output of the comparator CMP1 changes from a low level to a high level with the result that the relation between the output voltage of the charged pump circuit 10 and the output current thereof is brought back to a state represented by the mathematical expressions (54) through (57), and the input offset voltage Vio2 through Vion of the comparators CMP2 through CMPn is brought back to a state represented by the mathematical expression (53).

Contrary to this, when the voltage VR4 across both terminals of the current detecting resistor R4 increases so that the state represented by the mathematical expression of Vio2(=(Ra+Rb−Rc)·Ia)<VR4(=R4·(Iz−2Ic) is generated, the output of the comparator CMP2 changes from a high level to a low level. To the second step of the charged pump circuit 10, the clock signal φ2 is supplied via one of the input terminals of the NAND gate NA2 from the circuit 20 for generating a clock for driving the charged pump. However, since the output (on a low level) of the comparator CMP2 serves as the other input of the NAND gate NA2, the operation of the second step is suspended. At this time, since the output (on a low level) of the comparator CMP2 is input to the gate of the PMOS transistor MP2 via the level converter 60-2, the PMOS transistor MP2 is turned off. As a consequence, since the power source voltage VDD is supplied to the third to nth steps of the charged pump circuit 10, the third to nth steps of the charged pump circuit 10 are set to a state of operation.

Supposing that the voltage fall of the power source voltage VDD which is generated in the PMOS transistor MP2 can be ignored, the output voltage Vz, the Zener current Iz which flows through the Zener diodes ZD1 and ZD2, and the average consumed current IDD of the charged pump circuit 10 will be defined in the following manner in the case where the operation of the second step of the charged pump circuit 10 is suspended.

$$Vz=VDD+(n-2) \cdot (VDD-VD-(Iout+Iz)/(C \cdot f))-VD \quad (63)$$

$$Iz=(Vout-Vz)/(n-2) \cdot C \cdot f \quad (64)$$

$$IDD=(n-2) \cdot (Iout+Iz) \quad (65)$$

Here, Vout will be defined in the following manner.

$$Vout=VDD+(n-2) \cdot (VDD-VD-Iout/(C \cdot f))-VD \quad (66)$$

In this case, since the output of the comparator CMP2 has changed from a high level to a low level, the input offset voltage Vio2 of the comparator CMP2 changes. Furthermore, since the F input of the comparator CMP3 has changed from a high level to a low level, the input offset voltage Vio3 of the comparator CMP3 also changes.

Furthermore, since the B input of the comparator CMP1 has changed from a high level to a low level, the input offset voltage Vio1 of the comparator CMP1 further changes as well.

Consequently, the input offset voltages Vio1 through Vio(n−1) of the comparators CMP1 through CMP(n−1) change as shown in the following mathematical expressions in accordance with the mathematical expressions (23) and (24).

$$\left.\begin{aligned} Vio(n-1) &= (Ra + Rb + Rc) \cdot Ia \\ &\vdots \\ Vio4 &= (Ra + Rb + Rc) \cdot Ia \\ Vio3 &= (Ra + Rb - Rc) \cdot Ia \\ Vio2 &= (Ra - Rb - Rc) \cdot Ia \\ Vio1 &= -(Ra + Rb + Rc) \cdot Ia \end{aligned}\right\} \quad (67)$$

The input offset voltage Vio3 of the comparator CMP3 becomes smaller than the input offset voltages Vio4 through Vio(n−1) of the other comparators CMP4 through CMP(n−1) excluding the comparators CMP1 and CMP2, and, furthermore, the input offset voltage Vio2 of the comparator CMP2 becomes smaller than the input offset voltage Vio3 of the comparator CMP3. The input offset voltage Vio1 of the comparator CMP1 becomes a negative input offset voltage when the non-reversed input terminal of the comparator serves as a reference. This state continues in the case where the relation between the input offset voltage VR4 of each of the comparators, the input offset voltage Vio2 of the comparator CMP2 and the input offset voltage Vio3 of the comparator CMP3 is defined in the following mathematical expression of Vio2(=(Ra−Rb−Rc)·Ia)<VR4(=R4·(Iz−2Ic)) <Vio3(=(Ra+Rb−Rc)·Ia).

Supposing that the state represented by the mathematical expression of VR4(=R4·(Iz−2Ic))<Vio2(=(Ra−Rb−Rc)·Ia) is generated, the output of the comparator CMP2 changes from a low level to a high level so that the relation between the output voltage of the charged pump circuit 10 and the output current thereof is brought back to the state represented by the mathematical expressions (58) through (61), and the input offset voltages Vio1 through Vio(n−1) of the comparators CMP1 through CMP(n−1) are brought back to the state represented by the mathematical expression (62).

Contrary to this, the voltage across both terminals of the current detecting resistor R4 increases so that the state represented by the mathematical expression of Vio3(=(Ra+Rb−Rc)·Ia)<VR4(=R4·(Iz−2Ic)) is generated, the comparator CMP3 changes from a high level to a low level. As a consequence, the operation of the third step of the charged pump circuit 10 is also suspended.

As has been explained above, the output of the comparators CMP1 through CMP(n−1) changes from a high level to a low level in an order of CMP1→CMP2→ . . . CMP(n−1) in accordance with an increase in the Zener current Iz which flows through the Zener current detecting circuit 30, and the operation of the charged pump circuit 10 is suspended in an order of the first step→the second step→ . . . →(n−1)th step.

Consequently, the nth item which represents the number of steps of the charged pump in the relation expressions (54) through (57) between the output voltage of the charged pump circuit 10 and the output current thereof can be changed from n→(n−1)→ . . . →2 so that the number of the steps of the charged pump which are actually operated can be changed in such a manner that the number is decreased with an increase in the Zener current Iz. The relation between the current value of the Zener current detecting circuit 30 and the number of steps of the charged pump circuit 10 which are actually operated can be freely set with the offset resistance ratio of the offset resistors Ra, Rb and Rc of each of the comparators (CMP1 through CMP(n-1)) and the constant current value Ia of the constant current source 50 of each of the comparators.

The drive control circuit of the charged pump circuit according to the fourth embodiment of the invention has a Zener current detecting circuit 30 which serves as a current detecting circuit for detecting a current which flows through the Zener diodes for use in the output voltage clamp connected between the output terminal of the charged pump circuit and the earth, comparators CMP1 through CMP(n-1) and NAND gates NA1 through NAn which serve as a control circuit for changing the number of drive steps of the charged pump circuit in accordance with at least one of the detected output of the Zener current detecting circuit 30 and the power source voltage, and PMOS transistors MP1 through MP(n-1) and level converters 60-1 through 60-(n-1) which serve as a by-pass circuit for allowing the aforementioned power source voltage to be by-passed in such a manner that the power source voltage is to be supplied to the input side of the first step out of the drive steps in accordance with a change in the number of drive steps of the charged pump circuit with the result that the number of steps of the charged pump circuit which are actually operated can be changed in accordance with an increase and a decrease in the power source voltage VDD. Consequently, in the case where the output average current (load current) value Iout in the conventional charged pump circuit is constant, it is possible to inhibit an increase in an unutilized Zener current Iz which flows through the Zener diodes for use in the output voltage clamp, and an increase in the average consumed current IDD as a result of an increase in this Zener current Iz.

Furthermore, according to the fourth embodiment of the invention, since the unutilized Zener current which flows through the Zener diodes for use in the output voltage clamp is detected with the Zener current detecting circuit, and the number of drive steps of the charged pump circuit is changed in accordance with an increase and a decrease in the Zener current Iz in the same manner as the second embodiment, it is possible to prevent an increase in the unutilized Zener current Iz along with a change in the output average current (load current) value in the charged pump circuit, and an increase in the average consumed current IDD as a result of an increase in this Zener current Iz.

Furthermore, in the drive control circuit of the charged pump circuit according to the second embodiment of the invention, in the case where all the steps of the charged pump circuit are operated, a high voltage is applied to a portion between the source and the drain of the NMOS transistor MN1 constituting the by-pass circuit with the result that it becomes necessary to take measures to provide a large area which is grounded from the device periphery of the NMOS transistor MN1 in such a manner that the NPN bipolar transistor which the NMOS transistor has in a parasitic manner is not turned on with a substrate leak of the NMOS transistor MN1.

On the other hand, in the fourth embodiment, in the case where all the steps of the charged pump circuit are operated, it is the PMOS transistor constituting the by-pass circuit that a high voltage is applied to a portion between the drain and the source. Since, it is the PMOS transistor constituting the by-pass circuit that a high voltage is applied to a portion between the drain and the source in this manner, there is an advantage in that it will cease to happen that the parasitic NPN bipolar transistor is turned on with the substrate leak. In the case where the metal wiring layer is small and the endurance of the NMOS transistor against the pressure is not sufficient against the output voltage of the charged pump circuit, the output load current of the charged pump circuit changes in accordance with the operation power source voltage and is effective in the case where the operation insurance power source voltage scope is large.

Fifth Embodiment of the Invention

Figure 8:
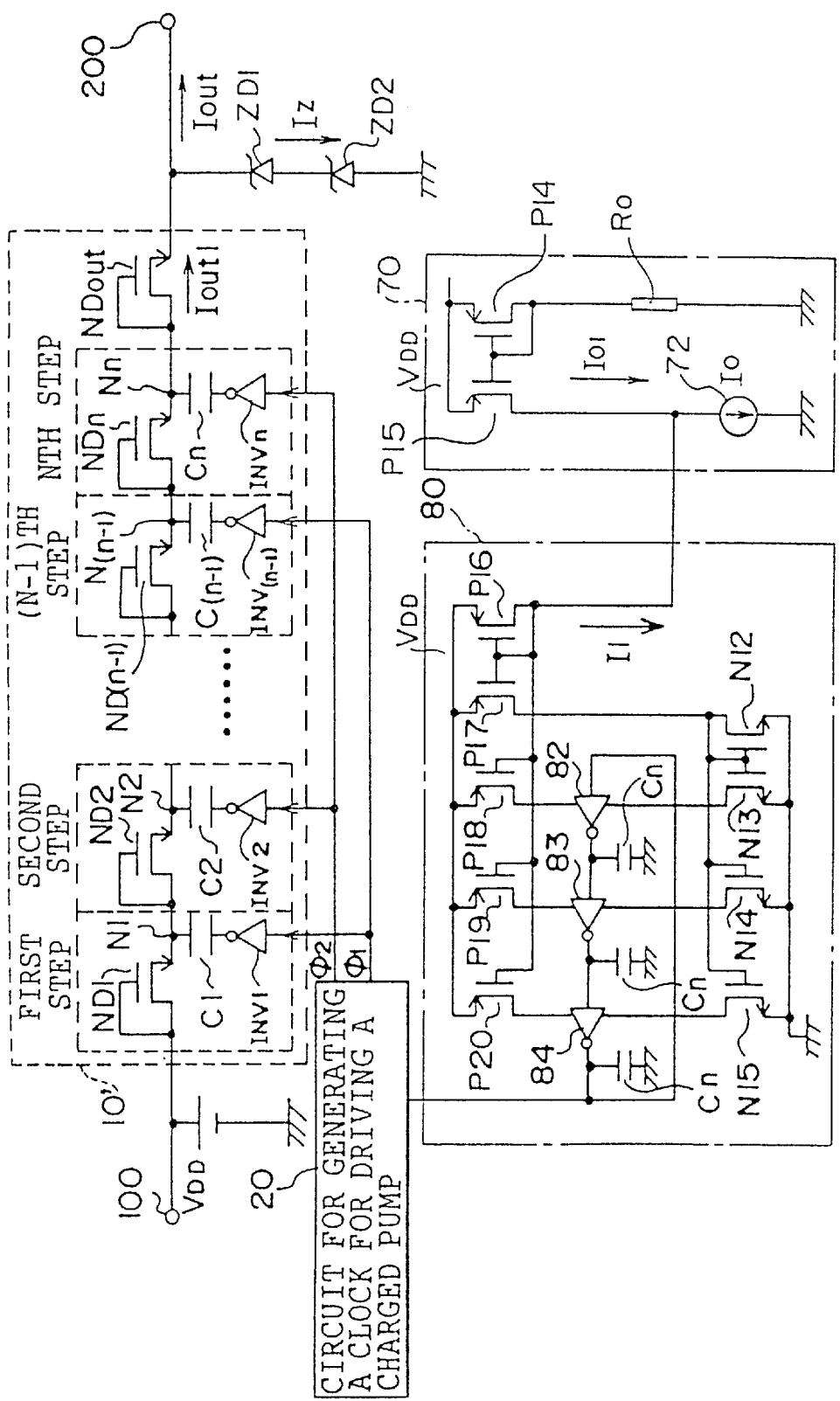
FIG. 8 is a circuit diagram showing a structure of the drive control circuit of the charged pump circuit according to a fifth embodiment of the invention.

A structure of the drive control circuit of the charged pump circuit according to the fifth embodiment of the invention is shown in FIG. 8. In FIG. 8, the drive control circuit of the charged pump circuit according to the fifth embodiment comprises a constant current source circuit 70 for generating a constant current having a negative power source voltage dependency constant, an oscillation circuit 80 driven by a constant current having the negative power source voltage dependency constant which current is generated by the constant current source circuit 70 for generating a pulse signal of a frequency having a negative power source dependency constant, and a clock signal supply circuit 20 for supplying two kinds of clock signals $\phi1$ and $\phi2$ which change in levels in a compensating manner so that the high level periods do not overlap each other.

The constant current source circuit 70 comprises PMOS transistors P14 and P15, a resistor R0, and a constant current source 72. The source and the gate of the PMOS transistors P14 and P15 are commonly connected so that the power source voltage VDD is supplied to the source of the PMOS transistors P14 and P15. The drain of the PMOS transistor P14 is grounded via the resistor R0. The drain and the gate of the PMOS transistor P14 are short-circuited. Furthermore, the drain of the PMOS transistor P15 is grounded via the constant current source 72, and, at the same time, the drain of the PMOS transistor P15 is grounded to the drain of the PMOS transistor P16 of the oscillation circuit 80. The PMOS transistors P14 and P15 constitutes a current mirror circuit.

The oscillation circuit 80 comprises inverters 82, 83 and 84 having an odd-number of steps which are connected in a ring-like manner, and PMOS transistors P16 through P20 and NMOS transistors N12 through N15 for driving these inverters 82, 83 and 84. The sources and the gates of the PMOS transistors P16 through P20 are commonly connected. A high power source voltage VDD is supplied to the source.

The PMOS transistors P16 through P20 constitute a current mirror circuit. The sources and the gates of the NMOS transistors are connected in common, and the sources thereof are grounded.

Furthermore, the drain of the PMOS transistor P16 is grounded via the constant current source 72 of the constant current source circuit 70. The drain of the PMOS transistor P17 is connected to the drain of the NMOS transistor N12. The drain of the NMOS transistor N12 is connected to the gate of the NMOS transistor N13. The drains of the PMOS transistors P18 through P20 are connected to the source of the PMOS transistors of the CMOS inverters constituting inverters 82 through 84 respectively.

Furthermore, the drains of the NMOS transistors N13 through N15 are connected to the sources of the NMOS transistors of CMOS inverters constituting the inverters 82 through 84. Reference Cn refers to a load capacity of the inverters 82 through 84.

The charged pump circuit 10' has the same structure as the conventional charged pump circuit shown in FIG. 14. The circuit 20 for generating a clock for driving the charged pump has the same structure as the circuit shown in FIG. 11. Therefore, overlapped explanation thereof will be omitted.

In the aforementioned structure, since the PMOS transistors P14 and P15 of the constant current source circuit 70 constitute a current mirror circuit, a current which flows to the resistor R0 from the PMOS transistor P14 becomes equal to the current I01 which flows into the constant current source 72 from the PMOS transistor 15. Consequently, when the threshold voltage of the PMOS transistor P14 of the constant current source circuit 70 is denoted by Vtmp, the output current I1 of the constant current source circuit 70 is given as a difference between the constant current I0 of the constant current source 72, and the current I01 which flows into the constant current source 72 which is determined by the threshold value voltage Vtmp of the PMOS transistor P14, the resistance value R0 of the resistor R0, and the voltage value of the power source voltage VDD. Since the current I01 can be represented by the mathematical expression of (VDD−Vtmp)/R0, the following mathematical expression is established.

$$I1=I0-(VDD-Vtmp)/R0 \qquad (68)$$

It has been made clear from the mathematical expression (68) that the output voltage I1 of the constant current source circuit 70 for driving the oscillation circuit 80 has a negative power source voltage dependency constant.

On the other hand, in the oscillation circuit 80, since the PMOS transistors P16 through P20 for driving the inverters 82 through 84 constitute the current mirror circuit, the output current I1 which is generated from the constant current source circuit 70 flows to the PMOS transistor P16 with the result that the voltage between respective gates and sources of the PMOS transistors P16 through P20 becomes equal because the gates and sources of the PMOS transistors P16 through P20 are connected in common. Then, the current I1 flows to each of the PMOS transistors P16 through P20. The NMOS transistors N12 through N15 are operated in such a manner that the current I1 is drawn via inverters 82 through 84. As a consequence, each of the load capacities Cn of the inverters 82 through 84 are charged and discharged with the current I so that a pulse signal of the frequency f which is determined by the delay time with respect to the input signal of inverters 82 through 84 and the number of steps of inverters 82 through 84. Here, when the number of steps of the inverters is denoted by N, the delay time in which the output changes from a high level to a low level out of the delay time of the inverters is denoted by TPLH, and the delay time when the output has changed from a high level to a low level with a change in the input from a low level to a high level is denoted by TPHL, the oscillation frequency f can be defined in the following manner.

$$f=1/(2N+1)\cdot(TPLH+TPHL) \qquad (69)$$

When the output current I1 of the constant current source circuit 70 increases, and the current which is supplied to each of the inverters 82, 83 and 84 (each of the drain currents of the PMOS transistors P18, P19 and P20) increases, the time which is required for the charge and the discharge of the load capacity Cn of the input node of the inverters at the next step which is connected after each of the inverters is shortened. Consequently, the oscillation frequency becomes higher.

On the other hand, when the output current I1 of the constant current source circuit 70 decreases, and the current which is supplied to each of the inverters 82, 83, and 84 increases, the time which is required for the charge and the discharge of the load capacity Cn of the input node of the inverters at the next step connected after each of the inverters increases so that the oscillation frequency is lowered. Consequently, the oscillation frequency f of the oscillation circuit 80 changes in proportion to the constant current I1 which is an output current of the constant current source circuit 70. Since the constant current I1 of constant current source circuit 70 has a negative power source voltage dependency constant, the oscillation frequency f of the oscillation circuit 80 also has a negative power source dependency constant.

The pulse signal of the frequency f which is generated by the oscillation circuit 80 is output to the circuit 20 for generating a clock for driving the charged pump, and the circuit 20 for generating a clock for driving the charged pump prepares two kinds of clock signals φ1 and φ2 which change in levels in a compensating manner so that the high level periods do not overlap each other, and the two clock signals φ1 and φ2 are supplied to the charged pump circuit 10'.

Since the charged pump circuit 10' shown in FIG. 8 is operated in the same manner as the conventional charged pump circuit shown in FIG. 14, the output voltage Vz of the charged pump 10', the Zener current Iz which flows through the Zener diodes ZD1 and ZD2 and the average output consumption current IDD will be defined in the following manner.

$$Vz=VDD+n\cdot(VDD-VD-(Iout+Iz)/(C\cdot f))-VD \qquad (70)$$

$$Iz=(Vout-Vz)/n\cdot C\cdot f \qquad (71)$$

$$IDD=n\cdot(Iout+Iz) \qquad (72)$$

Here, Vout will be defined in the following manner.

$$Vout=VDD+n\cdot(VDD-VD-Iout/(C\cdot f))-VD \qquad (73)$$

When the oscillation frequency f of the oscillation circuit 80 is set to a lower level at an appropriate constant in accordance with an increase in the power source voltage VDD, it is possible to inhibit an increase in the Zener current Iz along with an increase in the power source voltage VDD.

In the drive control circuit of the charged pump circuit according to the fifth embodiment of the invention, since the constant current having a negative power source voltage dependency constant is generated with the constant current source circuit, the pulse signal of the frequency having a negative power source voltage dependency constant is generated with the oscillation circuit which is driven with the constant current which has a negative power source voltage dependency constant, and the charged pump circuit is driven with the clock having the aforementioned frequency at the clock signal supply circuit, the operation frequency of the charged pump circuit can be changed in accordance with an increase and a decrease in the power source voltage VDD.

Consequently, in the case where the output voltage average current (load current) value Iout in the conventional charged pump circuit is constant, it is possible to inhibit an increase in the unutilized Zener current Iz which flows through Zener diodes for use in the output voltage clamp at the time of an increase in the power source voltage VDD, and an increase in the average consumed current IDD as a result of an increase in this Zener current Iz.

Furthermore, in the fifth embodiment of the invention, in the case where the power source voltage VDD changes when the charged pump circuit is operated, a response is given in such a manner that the operation frequency of the charged pump circuit changes instantly with respect to the change in the power source voltage with the result that the fifth embodiment is effective in the case where the change in the output load current of the charged pump circuit is small with respect to the change in the power voltage, but the power source voltage change can be generated during the operation.

Sixth Embodiment of the Invention

Figure 9:
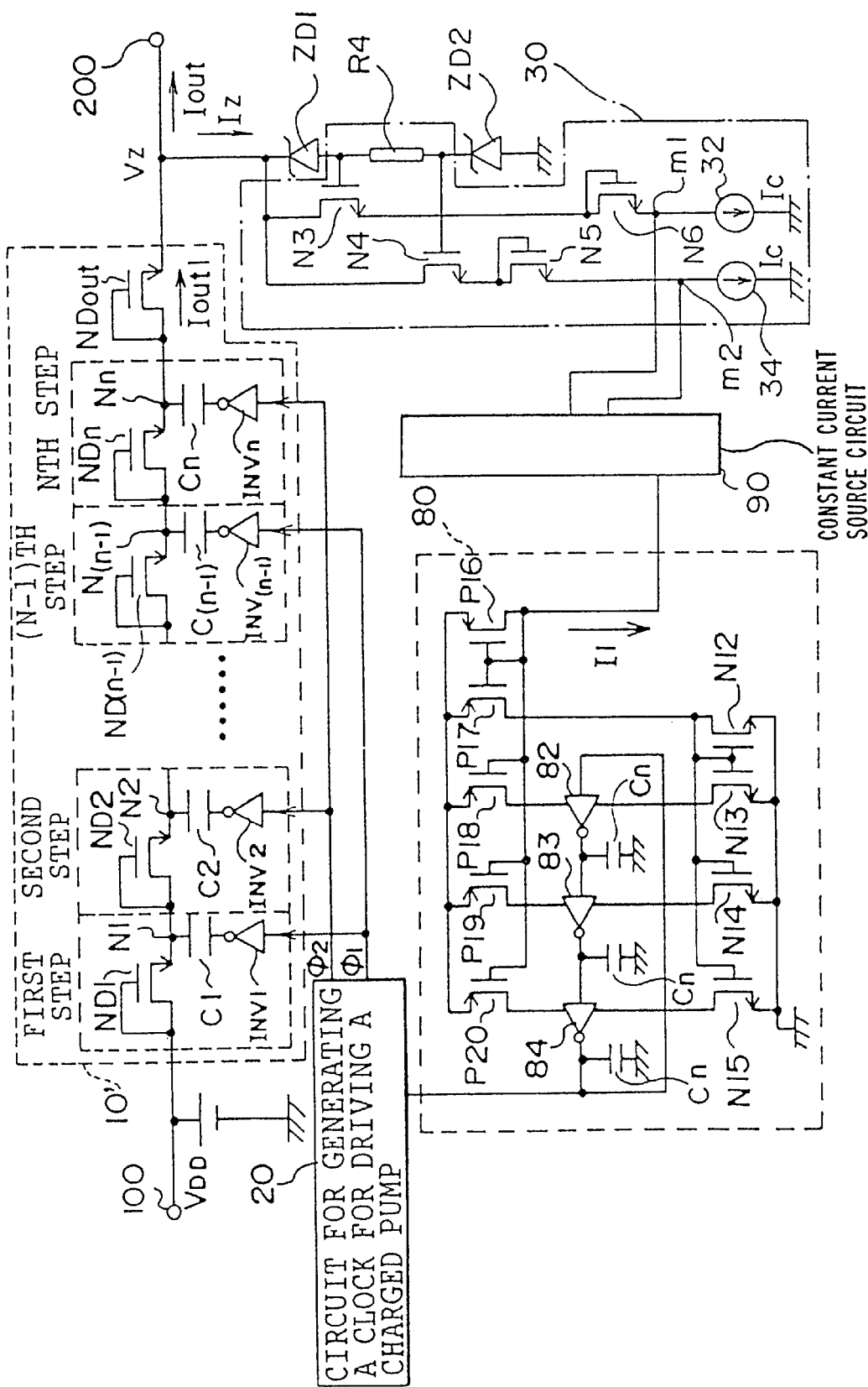
FIG. 9 is a circuit diagram showing a structure of the charged pump circuit according to a sixth embodiment of the invention.

The drive control circuit of the charged pump circuit according to the sixth embodiment of the invention as shown in FIG. 9 comprises a Zener current detecting circuit 30 for detecting a current which flows through Zener diodes for use in the output voltage clamp connected between the output terminal 200 of the charged pump circuit 10' and the earth, a constant current source circuit 90 for fetching the detected output of the Zener current detecting circuit and generating the constant current which stands in inverse proportion to a value of the current which flows through the aforementioned Zener diodes, an oscillation circuit 80 which is driven by the constant current source circuit 90 for generating a pulse signal of a frequency which stands in inverse proportion to the value of the current which flows through the aforementioned Zener diodes, and a clock signal supply circuit 20 for preparing two kinds of clock signals which change in levels in a compensating manner so that the high level periods do not overlap each other on the basis of the pulse signal output from the oscillation circuit 80 and supplying the two kinds of clock signals to the charged pump circuit 10'.

Since the charged pump circuit 10', the circuit for generating a clock for driving the charged pump 20, and the oscillation circuit 80 have the same structure as the fifth embodiment of the invention shown in FIG. 8, and the Zener current detecting circuit 30 has the same structure as the second and the fourth embodiment of the invention, the same components are denoted by the same reference numerals. An overlapped explanation thereof will be omitted as much as possible.

The Zener current detecting circuit 30 has a current detecting resistor R4 connected in series to the Zener diodes ZD1 and ZD2 for use in the output voltage clamp connected between the output terminal 200 of the charged pump circuit 10' and the earth, the NMOS transistors N3 through N6, and constant current sources 32 and 34, and devices are selected such that the characteristics of the NMOS transistors N3 and N4 are the same, and the characteristics of the NMOS transistors N5 and N6 are the same. The constant of each of the devices in the Zener current detecting circuit 30 is selected so that the constant current Ic flows into the constant current sources 32 and 34.

From a location between the connection point m1 between the source of the NMOS transistor N6 and the constant current source 32, and the connection point m2 between the source of the NMOS transistor N5 and the constant current source 34, the detected output of the Zener current detecting circuit 30, namely, the detected voltage obtained by converting into a voltage the Zener current which flows through the Zener diodes ZD1 and ZD2 for use in the output voltage clamp can be output.

Figure 10:
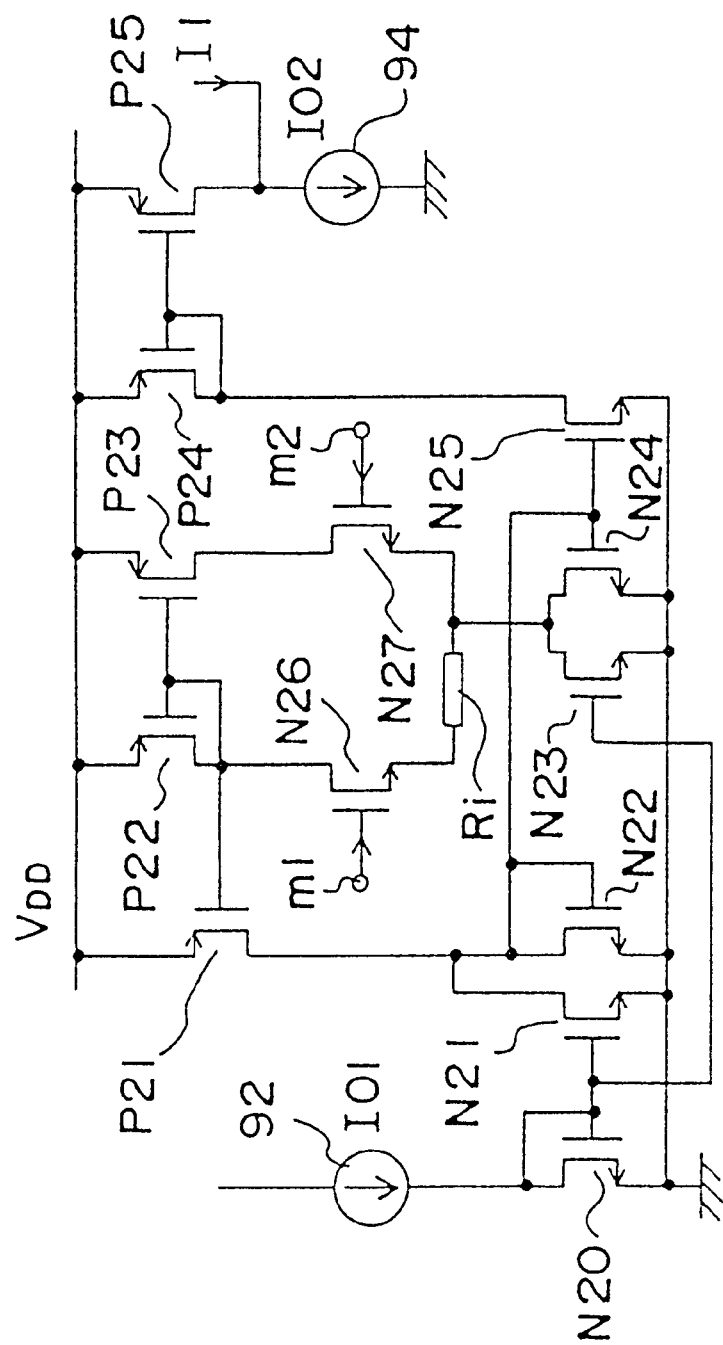
FIG. 10 is a circuit diagram showing a specific structure of the constant current source circuit shown in FIG. 9.

A concrete structure of the constant current source circuit 90 is shown in FIG. 10. In FIG. 10, the sources of the PMOS transistors P21, P22, P23, P24 and P25 are connected in common so that the power source voltage VDD is supplied thereto. The drains and the gates of the PMOS transistors P22 and P24 are short-circuited, respectively. The gates of the PMOS transistors P21, P22 and P23 are connected in common. The gate of the PMOS transistor P24 is connected to the gate of the PMOS transistor P25. The drain of the PMOS transistors P22 and P23 are connected to the drains of the NMOS transistors N26 and N27, respectively. The source of the NMOS transistor N26 and the source of the NMOS transistor N27 are connected via a resistor Ri. The gate of the NMOS transistor N26 is connected to the connection point m1 of the Zener current detecting circuit 30, and the gate of the NMOS transistor N27 is connected to the connection point m2 of the Zener current detecting circuit 30, respectively. The drains of the NMOS transistors N23 and N24 are connected in common. This connection point thereof is connected to the connection point between the resistor Ri and the source of the NMOS transistor N27. The drains of the NMOS transistors N21 and N22 are connected in common, and the connection point thereof is connected to the drain of the PMOS transistor P21. The drain and the gate of the NMOS transistor N22 are connected.

A portion between the drain and the gate of the NMOS transistor N20 is short-circuited. The gate of the NMOS transistor N20 is connected to the gate of the NMOS transistor N21. The source of the NMOS transistor N20 is grounded, and the drain thereof is connected to the constant current source 92 for supplying the constant current I01 to the NMOS transistor N20. The drain of the PMOS transistor P24 is connected to the drain of the NMOS transistor N25.

The drain of the PMOS transistor P25 is grounded via the constant current source 94 into which the constant current I02 flows. It is constituted that the output current I1 for driving the oscillation circuit 80 flows into the connection point between the drain of the PMOS transistor P25 and the constant current source 94.

Furthermore, the sources of the NMOS transistors N20, N21, N22, N23, N24, and N25 are connected in common and grounded. The gate of the NMOS transistor N21 and the gate of the NMOS transistor N23 are connected, and the gates of the NMOS transistors N22, N24 and N25 are connected in common.

The PMOS transistor P21 and the PMOS transistor P22, the PMOS transistor P23 and the PMOS transistor P24, and the PMOS transistor P24 and the PMOS transistor P25 constitute a current mirror circuit respectively.

Furthermore, the NMOS transistor N22 and the NMOS transistor N24, the NMOS transistor N22 and the NMOS transistor N25 constitute the current mirror circuit respectively.

Furthermore, in the constant current source circuit 90 according to the fifth embodiment, the connection point between the source of the NMOS transistor N27 and the resistor Ri constitutes an imaginary earth point. The dimension ratio of the PMOS transistors P21, P22 and P23 is set to P21:P22:P23=1:1:1, and, at the same time, the dimension ratio of the NMOS transistors N22 and N24 is set to N22:N24=1:2, and the dimension ratio of the NMOS transistors N21 and N23 is set to N21:N23=1:2.

In the aforementioned structure, when the characteristics of the NMOS transistor N3 and the NMOS transistor N4 in the Zener current detecting circuit 30 are made to be the same, and the characteristics of the NMOS transistor N5 and the NMOS transistor N6 are made to be the same, the output voltage between the connection points m1 and m2 becomes equal to the voltage VR4 between terminals of the current detecting resistor R4 for detecting the Zener current Iz.

Consequently, the detected output VR4 of the Zener current detecting circuit 30 will be defined in the following manner.

$$VR4 = R4 \cdot (Iz - 2Ic) \quad (74)$$

On the other hand, in the constant current detecting circuit 90, the resistor Ri is connected between the source of the NMOS transistor N26 having a gate connected to the connection point m1 and the source of the NMOS transistor N27 having a gate connected to the connection point m2. The connection point between the source of the NMOS transistor N27 and the resistor Ri serves as an imaginary earth point. Furthermore, the PMOS transistor P22 and the PMOS transistor P23 constitute the current mirror circuit. Consequently, the drain current Ids which flows through the NMOS transistor N26 and the NMOS transistor N27 become equal to each other. As a consequence, the voltage Vgs between the gate and the source becomes the same at the time of operation of the NMOS transistor N26 and the NMOS transistor N27.

Consequently, the voltage applied to a portion between the source of the NMOS transistor N26 and the source of the NMOS transistor N27 becomes equal to the voltage VR4 across both terminals of the current detecting resistor R4 of the Zener current detecting circuit 30.

Furthermore, the dimension ratio of the devices of the PMOS transistors P21, P22, and P23 is set to P21:P22:P23= 1:1:1. Furthermore, the device dimension ratio of the NMOS transistor N22 and the NMOS transistor N24 is set to N22:N24=1:2. Furthermore, the device dimension ratio of the NMOS transistor N21 and the NMOS transistor N23 is set to N21:N23=1:2. Consequently, in the case where the device dimension ratio of the NMOS transistor N20 and the NMOS transistor N21 is set to N20:N21=1:1, when the drain current of the PMOS transistors P21, P22, P23 is set to Idsp21 through Idsp23, and the drain current of the NMOS transistor N20 through N24 is set to Idsn20 through Idsn24, the following relation is established.

$$\left.\begin{array}{l}Idsn20 = Idsn21 = I01 \\ Idsp21 = Idsp22 = Idsp23 \\ \quad = I01 + VR4/Ri = I01 + (R4\cdot(iz-2Ic))/Ri \\ Idsn22 - Idsp23 - Idsn21 = ((R4\cdot(Iz-2Ic))/Ri \\ Idsn23 = 2\cdot Idsn21 = 2\cdot I01 \\ Idsn24 = 2\cdot Idsp23 = 2\cdot ((R4\cdot(Iz-2Ic))/Ri\end{array}\right\} \quad (75)$$

Supposing that the device dimension ratio of the NMOS transistor N22 and the NMOS transistor N25 is set to N22:N25=1:1, and the device dimension of the PMOS transistor P24 and the PMOS transistor P25 is set to P24:P25=1:1, the drain current which flows through the NMOS transistor N22 and the NMOS transistor N25 becomes equal because the NMOS transistor N22 and the NMOS transistor N25 constitute the current mirror circuit. Furthermore, the drain current which flows through the PMOS transistor P24 and the PMOS transistor P25 becomes equal because the PMOS transistor P24 and the PMOS transistor P25 constitute the current mirror circuit. Consequently, the drain current Idsn22 which flows through the NMOS transistor N22 and the drain current Idsp25 which flows through the PMOS transistor P25 becomes equal to each other.

Consequently, the output current I1 of the constant current source circuit 90 will be defined in the following manner from the mathematical expression (75).

$$I1 = I02 - ((R4\cdot(Iz-2Ic))/Ri \tag{76}$$

It has been made clear from the mathematical expression (76) that the output current I1 of the constant current source circuit 90 stands in inverse proportion (having a negative dependency constant) to the Zener current Iz.

On the other hand, when the output current I1 supplied by the constant current source circuit 90 in the oscillation circuit 80 increases, and the current (respective drain currents of the PMOS transistors P18, P19 and P20) supplied to respective inverters 82, 83 and 84 increase, the time required for the charge and discharge of the load capacity of input nodes of the inverters at next steps connected after respective inverters is shortened, and the oscillation frequency f of the pulse signal to be output becomes higher.

On the other hand, the constant current I1 supplied from the constant current source circuit 90 decreases and the current (respective drain currents of the PMOS transistors P18, P19 and P20) supplied to each of the inverters 82, 83 and 84 decreases, time required for the charge and discharge of the load capacity of the input nodes of inverters at the next step connected after each of the inverters increases and the oscillation frequency f of the pulse signal is lowered.

Consequently, the oscillation frequency f of the oscillation circuit 80 changes in proportion to the output current I1 of the constant current source circuit 90. The output voltage I1 of the constant current source circuit 90 stands in inverse proportion (having a negative dependency constant) to the Zener current Iz. Consequently, in the case where the Zener current increases and decreases, the oscillation frequency f of the oscillation circuit 80 changes in inverse proportion to the Zener current Iz.

Since the charged pump circuit 10' is operated in the same manner as the conventional charged pump circuit shown in FIG. 14, the output voltage Vz of the charged pump circuit 10', the Zener current Iz which flows through the Zener diodes ZD1 and ZD2 and the average consumed current IDD will be defined in the following manner.

$$Vz = VDD + n\cdot(VDD - VD - (Iout + Iz)/(C\cdot f)) - VD \tag{77}$$

$$Iz = (Vout - Vz)/n\cdot C\cdot f \tag{78}$$

$$IDD = n\cdot(Iout + Iz) \tag{79}$$

Here, Vout will be defined in the following manner.

$$Vout = VDD + n\cdot(VDD - VD - Iout/(C\cdot f)) - VD \tag{80}$$

In the sixth embodiment, since the oscillation frequency f of the constant current source circuit 90 where the Zener current Iz determines the frequency of the clock signal at an appropriate constant in accordance with an increased amount can be lowered, it is possible to suppress the value of the Zener current Iz by lowering the frequency of the clock signal for driving the charged pump circuit in the case where the Zener current Iz increases with an increase in the power source voltage VDD and a change in the output average current (load current) of the charged pump circuit.

In this manner, according to the sixth embodiment of the invention, since the current which flows through the Zener diodes for use in the output voltage clamp connected between the output terminal of the charged pump circuit and the earth is detected with the Zener current detecting circuit, the detected output of the Zener current detecting circuit is fetched, and the constant current which stands in inverse proportion to the value of the current which flows through the aforementioned Zener diodes is generated, the pulse signal of the frequency which stands in inverse proportion to the value of the current which flows through the aforementioned Zener diodes with the oscillation circuit which is driven with the constant current source circuit, and two kinds of clock signals are supplied to the charged pump circuit by preparing the aforementioned two kinds of two clock signals with the clock signal supply circuit on the basis of the pulse signal which is output from the oscillation circuit, it is possible to change the operation frequency of the charged pump circuit in accordance with an increase and a decrease in the Zener current Iz.

Consequently, in the case where the output average current (load current) value in the conventional charged pump circuit is constant, it is possible to inhibit an increase in an unutilized current which flows the Zener diodes for use in the output voltage clamp along with an increase in the power source voltage VDD, and an increase in the average consumed current IDD as result of an increase in this Zener current Iz.

Furthermore, according to the sixth embodiment, since the unutilized Zener current which flows through the Zener diodes for use in the output voltage clamp is detected with the Zener current detecting circuit, and the operation frequency of the charged pump circuit is changed in accordance with an increase and decrease in the Zener current Iz, it is possible to prevent an increase in the unutilized Zener current increases along with a change in the output average current (load current) value Iout in the charged pump circuit, and an increase in the average consumed current IDD as a result in an increase in this Zener current Iz.

Furthermore, according to the sixth embodiment of the invention, since a response is given in such a manner that the operation frequency of the charged pump circuit changes in an instant with respect to the change in the Zener current Iz, the charged pump circuit according to the sixth embodiment is effective in the case where the output load current of the charged pump circuit frequently changes.

What is claimed is:

1. A drive control circuit for a charge pump circuit, the charge pump circuit including
    a plurality of rectification elements connected in series between an input terminal and an output terminal, each of the rectification elements respectively including a node, and
    a plurality of capacitors each respectively having a first end and a second end, the first ends of the capacitors being coupled to respective ones of the nodes and clock signals being provided to the second ends of the capacitors,
    the charge pump circuit having a plurality of drive steps which raise a power source voltage that is supplied to the input terminal based on the clock signals,
    the clock signals including first and second clock signals which respectively change level, so that the clock signals provided to the capacitors coupled to the nodes of immediately adjacent ones of the rectification elements have high level periods that do not coincide, the drive control circuit comprising:
        a power source voltage detecting circuit that detects the power source voltage at the input terminal;
        a control circuit that changes a number of drive steps of the charge pump circuit based on the detected power source voltage; and
        a by-pass circuit that selectively by-passes the drive steps of the charge pump circuit to provide a final output of the changed number of drive steps directly to the output terminal, in accordance with the change in the number of drive steps.

2. The drive control circuit according to claim 1, wherein the number of drive steps of the charge pump circuit is decreased in accordance with an increase in the detected power source voltage.

3. The drive control circuit according to claim 1, wherein each of the rectification elements comprises an MOS transistor having a gate electrode and first and second electrodes, the gate electrode being electrically connected to the first electrode.

4. A drive control circuit for a charge pump circuit, the charge pump circuit including
    a plurality of first rectification elements connected in series between an input terminal and an output terminal, each of the first rectification elements respectively including a node,
    a plurality of capacitors each respectively having a first end and a second end, the first ends of the capacitors being coupled to respective ones of the nodes and clock signals being provided to the second ends of the capacitors, and
    second rectification elements as an output voltage clamp connected between the output terminal and ground,
    the charge pump circuit having a plurality of drive steps which raise a power source voltage that is supplied to the input terminal based on the clock signals,
    the clock signals including first and second clock signals which respectively change level, so that the clock signals provided to the capacitors coupled to the nodes of immediately adjacent ones of the first rectification elements have high level periods that do not coincide, the drive control circuit comprising:
        a current detecting circuit that detects current flowing in the second rectification elements;
        a control circuit that changes a number of drive steps of the charge pump circuit based on the detected current; and
        a by-pass circuit that selectively by-passes the drive steps of the charge pump circuit to provide a final output of the changed number of drive steps directly to the output terminal, in accordance with the change in the number of drive steps.

5. The drive control circuit according to claim 4, wherein the number of drive steps of the charge pump circuit is decreased in accordance with an increase in the detected current.

6. The drive control circuit according to claim 4, wherein each of the first rectification elements comprises an MOS transistor having a gate electrode and first and second electrodes, the gate electrode being electrically connected to the first electrode.

7. The drive control circuit according to claim 4, wherein each of the second rectification elements comprises a Zener diode.

8. A drive control circuit for a charge pump circuit, the charge pump circuit including
    a plurality of rectification elements connected in series between an input terminal and an output terminal, each of the rectification elements respectively including a node, and
    a plurality of capacitors each respectively having a first end and a second end, the first ends of the capacitors being coupled to respective ones of the nodes and clock signals being provided to the second ends of the capacitors,
    the charge pump circuit having a plurality of drive steps which raise a power source voltage that is supplied to the input terminal based on the clock signals,
    the clock signals including first and second clock signals which respectively change level, so that the clock signals provided to the capacitors coupled to the nodes of immediately adjacent ones of the rectification elements have high level periods that do not coincide, the drive control circuit comprising:

a power source voltage detecting circuit that detects the power source voltage at the input terminal;

a control circuit that changes a number of drive steps of the charge pump circuit based on the detected power source voltage; and a by-pass circuit that selectively by-passes the drive steps of the charge pump circuit to couple the input terminal directly to a first drive step of the changed number of drive steps, in accordance with the change in the number of drive steps.

9. The drive control circuit according to claim 8, wherein the number of drive steps of the charge pump circuit is decreased in accordance with the detected power source voltage.

10. The drive control circuit according to claim 8, wherein each of the rectification elements comprises an MOS transistor having a gate electrode and first and second electrodes, the gate electrode being electrically connected to the first electrode.

11. A drive control circuit for a charge pump circuit, the charge pump circuit including a plurality of first rectification elements connected in series between an input terminal and an output terminal, each of the first rectification elements respectively including a node, a plurality of capacitors each respectively having a first end and a second end, the first ends of the capacitors being coupled to respective ones of the nodes and clock signals being provided to the second ends of the capacitors, and second rectification elements as an output voltage clamp connected between the output terminal and ground, the charge pump circuit having a plurality of drive steps which raise a power source voltage that is supplied to the input terminal based on the clock signals, the clock signals including first and second clock signals which respectively change level, so that the clock signals provided to the capacitors coupled to the nodes of immediately adjacent ones of the first rectification elements have high level periods that do not coincide, the drive control circuit comprising:

a current detecting circuit that detects current flowing in the second rectification elements;

a control circuit that changes a number of drive steps of the charge pump circuit based on the detected current; and a by-pass circuit that selectively by-passes the drive steps of the charge pump circuit to couple the input terminal directly to a first drive step of the changed number of drive steps, in accordance with the change in the number of drive steps.

12. The drive control circuit according to claim 11, wherein the number of drive steps of the charge pump circuit is decreased in accordance with an increase in the detected current.

13. The drive control circuit according to claim 11, wherein each of the first rectification elements comprises an MOS transistor having a gate electrode and first and second electrodes, the gate electrode being electrically connected to the first electrode.

14. The drive control circuit according to claim 11, wherein each of the second rectification elements comprises a Zener diode.

* * * * *